US009639771B2

(12) United States Patent
Mine et al.

(10) Patent No.: US 9,639,771 B2
(45) Date of Patent: May 2, 2017

(54) IMAGE PROCESSING DEVICE

(71) Applicant: Sharp Kabushiki Kaisha, Osaka-shi, Osaka (JP)

(72) Inventors: Takashi Mine, Osaka (JP); Yoshimitsu Murahashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/908,719

(22) PCT Filed: Jul. 24, 2014

(86) PCT No.: PCT/JP2014/069592
§ 371 (c)(1),
(2) Date: Jan. 29, 2016

(87) PCT Pub. No.: WO2015/033695
PCT Pub. Date: Mar. 12, 2015

(65) Prior Publication Data
US 2016/0171338 A1 Jun. 16, 2016

(30) Foreign Application Priority Data

Sep. 6, 2013 (JP) ................................ 2013-184827
Jan. 31, 2014 (JP) ................................ 2014-017477

(51) Int. Cl.
*G06K 9/48* (2006.01)
*G06K 9/46* (2006.01)
(Continued)

(52) U.S. Cl.
CPC ......... *G06K 9/4604* (2013.01); *G06K 9/3233* (2013.01); *G06K 9/4609* (2013.01);
(Continued)

(58) Field of Classification Search
CPC .. G06K 9/4604; G06K 9/4661; G06K 9/4642; G06K 7/10722; G06T 5/002; G06T 2207/20192; H04N 5/142
See application file for complete search history.

(56) References Cited

U.S. PATENT DOCUMENTS 497,258 A * 5/1893 Wolf ........................ A63G 9/16
472/121
5,987,151 A * 11/1999 Akashi .................... G06T 7/004
351/210

(Continued)

FOREIGN PATENT DOCUMENTS

JP 2003-348379 A 12/2003
JP 2004-336652 A 11/2004

OTHER PUBLICATIONS

Official Communication issued in International Patent Application No. PCT/JP2014/069592, mailed on Oct. 21, 2014.

*Primary Examiner* — Ali Bayat
(74) *Attorney, Agent, or Firm* — Keating & Bennett, LLP

(57) ABSTRACT

An image processing device (1000) includes a luminance variation detection unit (1), an angular variation detection unit (2), an image region detection unit (3), and an image processing unit (4). The luminance variation detection unit (1) detects a degree of variation of pixel value in a pixel reference region including a pixel of interest and pixels around the pixel of interest. The angular variation detection unit (2) acquires a contour direction where the pixel value is constant in the pixel reference region for each pixel and detects a degree of variation of the acquired contour direction. The image region detection unit (3) acquires an image region detection signal representing characteristics of the image region including the pixel of interest based on the degree of variation of the pixel value and the degree of variation of the contour direction. The image processing unit
(Continued)

(4) performs a predetermined image process on the pixel of interest based on the image region detection signal.

10 Claims, 17 Drawing Sheets

(51) Int. Cl.
    *H04N 5/14*         (2006.01)
    *G06T 5/00*         (2006.01)
    *G06K 9/32*         (2006.01)

(52) U.S. Cl.
    CPC ......... *G06K 9/4642* (2013.01); *G06K 9/4661* (2013.01); *G06T 5/002* (2013.01); *H04N 5/142* (2013.01); *G06T 2207/20192* (2013.01)

(56) References Cited

U.S. PATENT DOCUMENTS

| | | | | |
|---|---|---|---|---|
| 7,600,689 B2* | 10/2009 | Tsikos | ................. | B82Y 15/00 235/462.01 |
| 2009/0179995 A1* | 7/2009 | Fukumoto | .......... | H04N 5/23248 348/208.6 |

* cited by examiner

FIG. 3
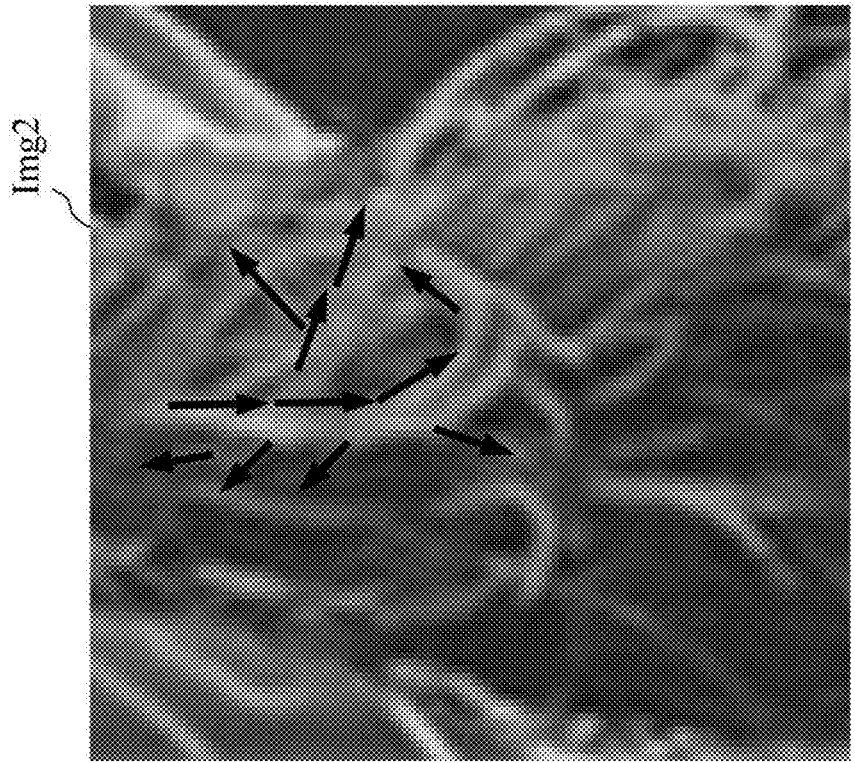
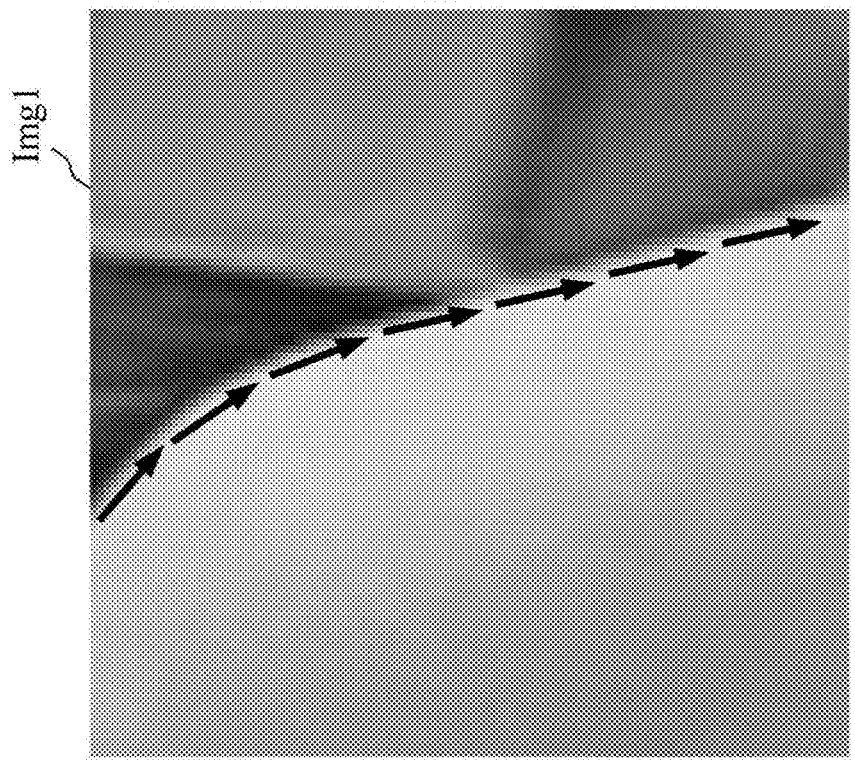

IMAGE PROCESSING DEVICE

TECHNICAL FIELD

The present invention relates to an image processing technique, for example, a technique of extracting an image region having predetermined characteristics and performing a predetermined image process on the extracted image region.

BACKGROUND ART

With the spread of information and communication technologies, various image (video) contents are provided in various forms.

On the other hand, display devices capable of displaying a high resolution video (image) such as full high vision are spread, and thus, there is much opportunity to display various image (video) contents on the display device. For example, there is much opportunity to display low resolution image (video) contents having a resolution of horizontal 640 pixels and vertical 360 pixels on a high resolution display device corresponding to a full high vision standard of horizontal 1920 pixels and vertical 1080 pixels. In the high resolution display device, 1920 pixels×1080 pixels image (video) can be displayed by performing an upscale process of an embedded scaler on an image (video) having a resolution lower than the display resolution. However, if a low-resolution image (video) is displayed as a high resolution image by the upscale process, in some cases, jaggies occur in the edge portion.

In addition, in the high resolution display device, in a case where a compressed image (video) is decoded to be displayed, in some cases, mosquito noise occurs in the edge portion.

If a sharpening process (for example, a sharpness emphasis process or an enhancement process) is performed on the image, jaggies or mosquito noise are overemphasized in the edge portion, so that there is a problem in that image quality is deteriorated. If a sharpening process disclosed in, for example, Patent Literature 1 (JP 2003-348379 A) is performed on an image like the above-described image, a feeling of detail of a texture portion can be improved, but jaggies or mosquito noise of an edge portion are overemphasized, so that the jaggies or mosquito noise are noticeable in the edge portion.

Since the jaggies or noises occurring in the edge portion become obstruction, it is preferable that the jaggies or noises are reduced.

Techniques for reducing the jaggies or noises occurring in the edge portion have been developed. For example, Patent Literature 2 (JP 2004-336652 A) discloses a technique of reducing mosquito noise without destructing detail of a significant texture portion by identifying a pixel of interest based on an edge detection signal, a smoothened signal, and an edge signal and performing a filtering process based on identification information indicating a result of the identification and the edge signal.

SUMMARY OF INVENTION

Technical Problem

However, in the technique of Patent Literature 2, a method of separating an edge portion and a texture portion by setting a threshold value with respect to a result of a high pass filtering process on an input video signal is adopted, and according to a state of the input video signal, the edge portion and the texture portion cannot be appropriately separated, so that in some cases, a noise reduction process cannot also be appropriately performed. In the technique of Patent Literature 2, for example, in a case where a video signal where contrast of luminance value is greatly changed is input, when the contrast of the luminance value of the video signal is within a predetermined range, the edge portion and the texture portion are appropriately separated, and thus, the noise reduction process is appropriately performed; but in a case where the contrast of the luminance value of the video signal is not within the predetermined range, the edge portion and the texture portion cannot be appropriately separated, and as a result, the noise reduction process cannot also be appropriately performed.

The present invention is, considering the above problem, to implement an image processing device (video processing device) capable of appropriately performing an image process (for example, a noise reduction process or an enhancement process) by appropriately separating an edge portion and a texture portion even in a case where contrast of a luminance value or the like of an input image signal (video signal) is greatly changed.

Solution to Problem

In order to solve the above problem, according to a first configuration of the present invention, there is provided an image processing device including a luminance variation detection unit, an angular variation detection unit, an image region detection unit, and an image processing unit.

The luminance variation detection unit detects a degree of variation of a pixel value in a pixel reference region including a pixel of interest and pixels around the pixel of interest.

The angular variation detection unit acquires a contour direction where the pixel value is constant in the pixel reference region for each pixel and detects a degree of variation of the contour direction acquired for each pixel.

The image region detection unit acquires an image region detection signal representing characteristics of an image region including the pixel of interest based on the degree of variation of the pixel value and the degree of variation of the contour direction.

The image processing unit performs a predetermined image process on the pixel of interest based on the image region detection signal.

Advantageous Effects of Invention

According to the present invention, it is possible to implement an image processing device (video processing device) capable of appropriately performing an image process (for example, a noise reduction process) by appropriately separating an edge portion and a texture portion even in a case where contrast of a luminance value or the like of an input image signal (video signal) is greatly changed.

BRIEF DESCRIPTION OF DRAWINGS

FIG. 3 is a diagram schematically illustrating contour directions θ by arrows repeatedly in an image region Img1 including an edge portion and an image region Img2 including a texture portion.

MODE FOR CARRYING OUT THE INVENTION

First Embodiment

Hereinafter, a first embodiment will be described with reference to the drawings.

<1.1: Configuration of Image Processing Device>

Figure 1:
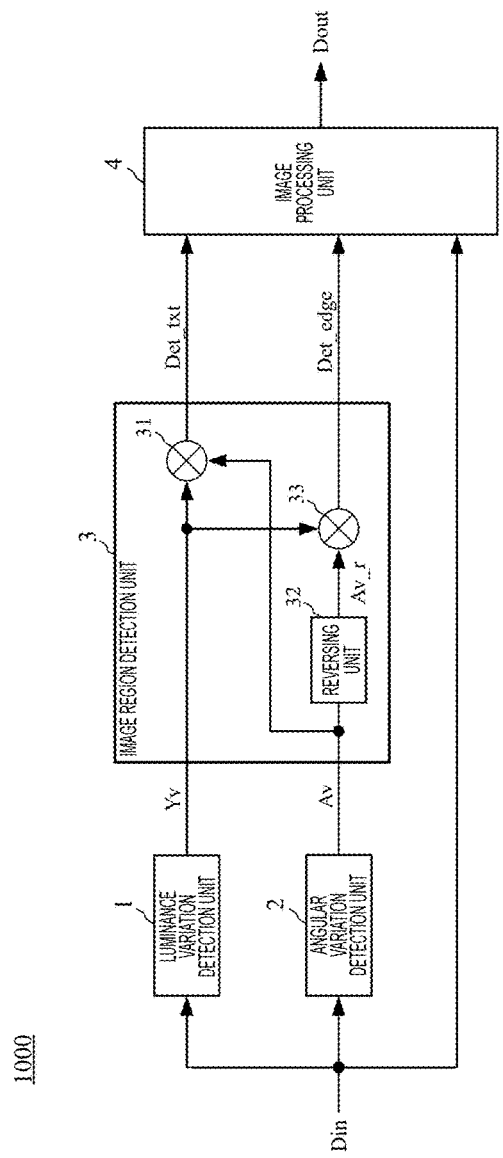
FIG. 1 is a schematic configuration diagram of an image processing device 1000 according to a first embodiment.

FIG. 1 is a schematic configuration diagram of an image processing device 1000 according to a first embodiment.

Figure 2:
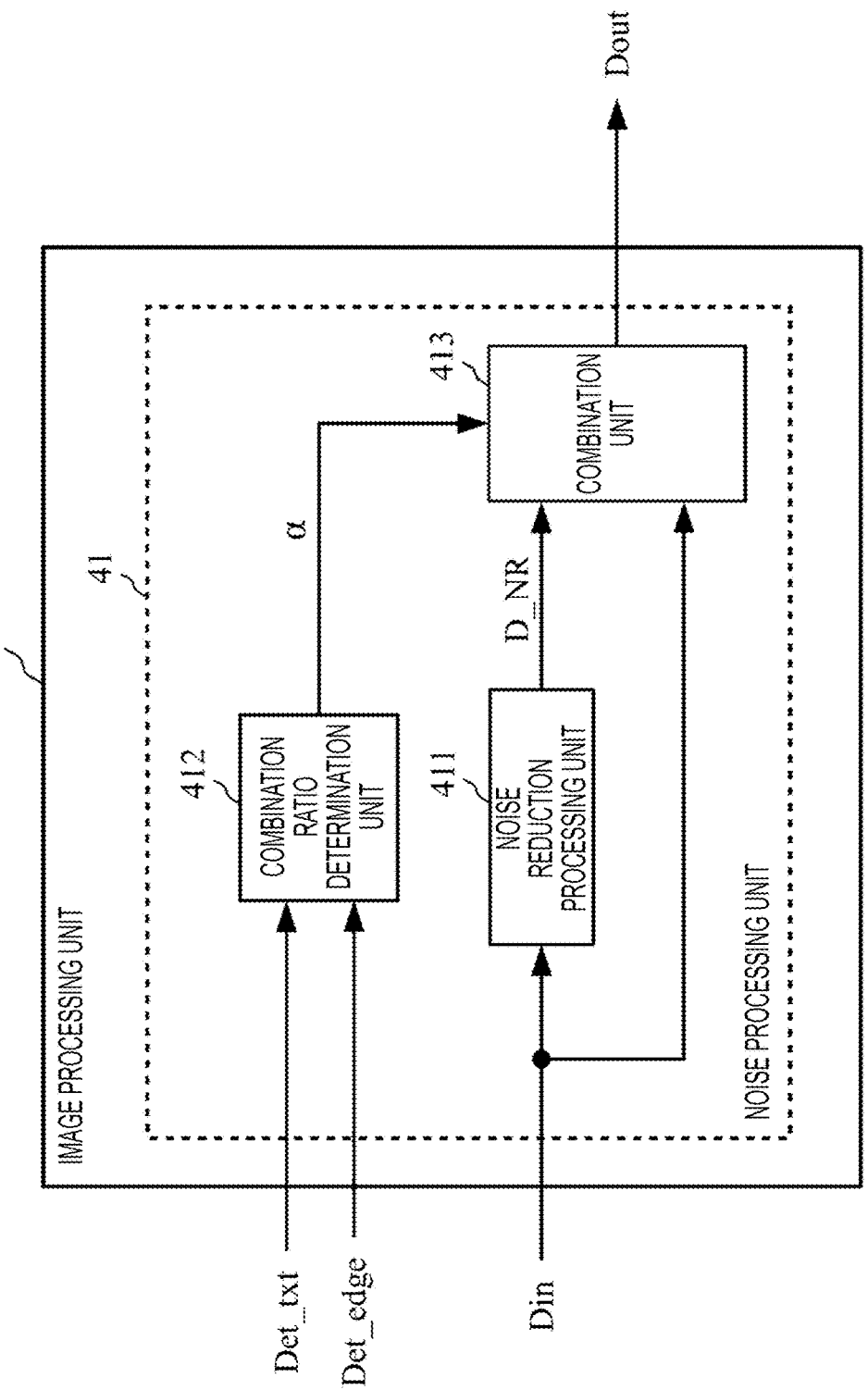
FIG. 2 is a schematic configuration diagram of an image processing unit 4 of the image processing device 1000 according to the first embodiment.

FIG. 2 is a schematic configuration diagram of an image processing unit 4 of the image processing device 1000 according to the first embodiment.

As illustrated in FIG. 1, the image processing device 1000 is configured to include a luminance variation detection unit 1, an angular variation detection unit 2, an image region detection unit 3, and an image processing unit 4.

The luminance variation detection unit 1 is input with an image signal (video signal) Din and calculates a luminance variation value Yv for each pixel of an image Din (image formed according to the image signal (video signal) Din). In addition, a coordinate of a pixel of interest (process target pixel) on the image is denoted by (x1, y1), and the luminance variation value of the pixel of interest (x1, y1) is denoted by Yv(x1, y1).

The luminance variation detection unit 1 outputs the calculated luminance variation value Yv to the image region detection unit 3.

The angular variation detection unit 2 is input with the image signal (video signal) Din and calculates an angular variation value Av for each pixel of the image Din. In addition, the angular variation value of the pixel of interest (x1, y1) is denoted by Av (x1, y1).

The angular variation detection unit 2 outputs the calculated angular variation value Av to the image region detection unit 3.

As illustrated in FIG. 1, the image region detection unit 3 is configured to include a first multiplier 31, a reversing unit 32, and a second multiplier 33.

The first multiplier 31 is input with the luminance variation value Yv output from the luminance variation detection unit 1 and the angular variation value Av output from the angular variation detection unit 2. The first multiplier 31 multiplies the luminance variation value Yv and the angular variation value Av for each pixel and outputs a texture detection signal Det_txt having the value of multiplication result as a signal value to the image processing unit 4.

The reversing unit 32 is input with the angular variation value Av output from the angular variation detection unit 2. If the range that can be taken by the angular variation value Av is 0 to Max1, that is, $0 \leq Av \leq Max1$, the reversing unit 32 outputs to the second multiplier 33 a reversed value Av_r of the angular variation value calculated by the following equation.

$$Av\_r = Max1 - Av$$

The second multiplier 33 is input with the luminance variation value Yv output from the luminance variation detection unit 1 and the reversed value Av_r of the angular variation value output from the reversing unit 32. The second multiplier 33 multiplies the luminance variation value Yv and the reversed value Av_r of the angular variation value and outputs an edge detection signal Det_edge having the value of multiplication result as a signal value to the image processing unit 4.

The image processing unit 4 is input whit the image signal (video signal) Din and the texture detection signal Det_txt and the edge detection signal Det_edge output from the image region detection unit 3. The image processing unit 4 performs a predetermined image process on the image signal based on the texture detection signal Det_txt and the edge detection signal Det_edge and outputs an image-processed image signal Dout.

For example, as illustrated in FIG. 2, the image processing unit 4 is configured to include a noise processing unit 41.

As illustrated in FIG. 2, the noise processing unit 41 is configured to include a noise reduction processing unit 411, a combination ratio determination unit 412, and a combination unit 413.

The noise reduction processing unit 411 is input with the image signal (video signal) Din and performs a noise reduction process on the image signal Din. Then, the noise reduction processing unit 411 outputs the noise-reduction-processed image signal as an image signal D_NR to the combination unit 413.

The combination ratio determination unit 412 is input with the texture detection signal Det_txt and the edge detection signal Det_edge output from the image region detection unit 3 and determines combination ratio α based on the texture detection signal Det_txt and the edge detection signal Det_edge. The combination unit 413 outputs the determined combination ratio α to the combination unit 413.

The combination unit 413 is input with the image signal (video signal) Din, the image signal D_NR output from the noise reduction processing unit 411 and the combination ratio α output from the combination ratio determination unit 412. The combination unit 413 combines the image signal (video signal) Din and the image signal D_NR based on the combination ratio α and outputs the combined image signal as an image signal Dout.

<1.2: Operation of Image Processing Device>

Hereinafter, operations of the image processing device 1000 having the above-described configuration will be described.

The luminance variation detection unit 1 calculates the luminance variation value Yv from the input image signal (video signal) Din. More specifically, if the coordinate of the pixel of interest on the image is denoted by (x, y) and the pixel value (luminance value) of the pixel of interest (x, y) is denoted by P(x, y), the luminance variation value Yv(x, y) of the pixel of interest (x, y) is calculated by the following mathematical formula.

[Mathematical Formula 1]

$$Yv(x, y) = \frac{1}{(2n+1)^2} \sum_{j=-n}^{n} \sum_{i=-n}^{n} (P(x+i, y+j) - P\_ave(x, y))^2 \quad (1)$$

$$P\_ave(x, y) = \frac{1}{(2n+1)^2} \sum_{j=-n}^{n} \sum_{i=-n}^{n} P(x+i, y+j)$$

Namely, the luminance variation value Yv(x, y) is a variation value of a pixel value (luminance value) in an image region of (2n+1) pixels×(2n×1) pixels (n: a natural number) centered at the pixel of interest (x, y).

The luminance variation detection unit 1 calculates the luminance variation value Yv for each pixel by performing a process corresponding to the above-described mathematical formula.

The calculated luminance variation value Yv is output from the luminance variation detection unit 1 to the first multiplier 31 and the second multiplier 33 of the image region detection unit 3.

In addition, the luminance variation detection unit 1 may be configured so as to output the luminance variation value Yv as a binary signal. Namely, if a predetermined threshold value is denoted by Th_Yv, the luminance variation detection unit 1 may output to the first multiplier 31 and the second multiplier 33 the luminance variation value Yv as follows:

(1) when Yv(x, y)≥Th_Yv, Yv(x, y)=1; and
(2) when Yv(x, y)<Th_Yv, Yv(x, y)=0.

The angular variation detection unit 2 calculates a contour direction θ from the input image signal (video signal) Din. More specifically, if the coordinate of the pixel of interest on the image is denoted by (x, y) and the pixel value (luminance value) of the pixel of interest (x, y) is denoted by P(x, y), the contour direction θ(x, y) of the pixel of interest (x, y) is calculated by a process corresponding to the following mathematical formula.

[Mathematical Formula 2]

$$\theta(x, y) = \tan^{-1}\left(-\frac{\partial}{\partial x}P(x, y) / \frac{\partial}{\partial y}P(x, y)\right) \quad (2)$$

In addition, it is assumed that P(x, y) is differentiable on the image, that is, on the x-y plane.

In the Mathematical Formula 2, the contour direction θ(x, y) is an angle counterclockwise relative to the horizontal direction (x direction). The contour direction θ(x, y) is calculated as an angle giving a tangent value obtained by dividing an x-directional partial derivative value of the pixel value (luminance value) P(x, y) by a y-directional partial derivative value of the pixel value P(x, y). In order to apply the above-described Mathematical Formula 2 to a discrete value, the angular variation detection unit 2 calculates an x-directional partial derivative value Gx(x, y) of the pixel of interest (x, y) and a y-directional partial derivative value Gy(x, y) of the pixel of interest by processes corresponding to the following Mathematical Formulas 3 and 4.

[Mathematical Formula 3]

$$Gx(x, y) = \sum_{j=-n}^{n} \sum_{i=-n}^{n} P(x+i, y+j) \cdot Wx(x+i, y+j) \quad (3)$$

[Mathematical Formula 4]

$$Gy(x, y) = \sum_{j=-n}^{n} \sum_{i=-n}^{n} P(x+i, y+j) \cdot Wy(x+i, y+j) \quad (4)$$

In addition, Wx(x+i, y+j) and Wy(x+i, y+j) denote filter coefficients.

The filter coefficient Wx(x+i, y+j) are as follows:
(1) when −n≤i<0; Wx(x+i, y+j)=−1;
(2) when i=0; Wx(x+i, y+j)=0; and
(3) when 0<i≤n, Wx(x+i, y+j)=1.

The filter coefficient Wy(x+i, y+j) are as follows:
(1) when −n≤j<0, Wy(x+i, y+j)=−1;
(2) when j=0, Wy(x+i, y+j)=0; and
(3) when 0<j≤n, Wy(x+i, y+j)=1.

By the processes corresponding to Mathematical Formulas 3 and 4, the x-directional partial derivative value Gx(x, y) of the pixel of interest (x, y) and the y-directional partial derivative value Gy(x, y) of the pixel of interest are calculated.

Then, the angular variation detection unit 2 quantizes the contour direction θ(x, y) calculated based on the calculated x-directional partial derivative value Gx(x, y) and y-directional partial derivative value Gy(x, y) to calculate a quantization contour direction A(x, y) representing the quantized contour direction. The angular variation detection unit 2 calculates the quantization contour direction A(x, y) by a process corresponding to, for example, the following Mathematical Formula 5.

[Mathematical Formula 5]

$$A(x, y) = \text{round}\left(\frac{N_d}{\pi}\tan^{-1}(Gy(x, y) / Gx(x, y))\right) \quad (5)$$

In the above-described Mathematical Formula 5, round(z) is a rounding function giving an integer value obtained by rounding off two digits after the decimal point of a real number z. Nd is a constant representing the number of quantized contour directions (quantization contour direction number). For example, the quantization contour direction number Nd is any value of 8 to 32. Namely, the quantization contour direction A(x, y) is represented by any integer of 0 to Nd−1 which is obtained by rounding a value obtained by dividing the contour direction θ(x, y) by a quantization interval π/Nd. In addition, in order to avoid division by zero, in a case where the absolute value |Gx(x, y)| of the x-directional partial derivative value Gx(x, y) is smaller than a pre-defined infinitesimal real number (for example, 10^−6), the angular variation detection unit 2 sets the value of tan⁻¹( ) as π/2. In addition, in some calculation process systems, in order to avoid an error according to the above-described division or the division by zero, a tangent function having two arguments of Gx and Gy may be prepared, but the angular variation detection unit 2 may obtain the value of $\tan^{-1}(\ )$ by using these values.

The angular variation detection unit 2 calculates the angular variation value Av(x, y) of the pixel of interest (x, y) by using the value A(x, y) of the quantization contour direction calculated by the above-described processes. More specifically, the angular variation detection unit 2 calculates the angular variation value Av(x, y) by a process corresponding to the following Mathematical Formula 6.

[Mathematical Formula 6]

$$Av(x, y) = \frac{1}{(2n+1)^2} \sum_{j=-n}^{n} \sum_{i=-n}^{n} (A(x+i, y+j) - A\_ave(x, y))^2 \quad (6)$$

$$A\_ave(x, y) = \frac{1}{(2n+1)^2} \sum_{j=-n}^{n} \sum_{i=-n}^{n} A(x+i, y+j)$$

By the above-described process, the angular variation value Av(x, y) calculated by the angular variation detection unit 2 is output to the first multiplier 31 and the reversing unit 32 of the image region detection unit 3.

In addition, the angular variation detection unit 2 may be configured so as to output the angular variation value Av as a binary signal. Namely, if a predetermined threshold value is denoted by Th_Av, the angular variation detection unit 2 may output to the first multiplier 31 and the reversing unit 32 the angular variation value Av as follows:

(1) when Av(x, y)≥Th_Av, Av(x, y)=1; and
(2) when Av(x, y)<Th_Av, Av(x, y)=0.

The first multiplier 31 of the image region detection unit 3 acquires the texture detection signal Det_txt by multiplying the luminance variation value Yv output from the luminance variation detection unit 1 and the angular variation value Av output from the angular variation detection unit 2 for each pixel.

More specifically, the first multiplier 31 acquires the value Det_txt(x, y) of the texture detection signal of the pixel of interest (x, y) by the following equation.

$$Det\_txt(x,y) = Yv(x,y) \times Av(x,y)$$

In general, the luminance variation values and the angular variation values in the edge portion, the texture portion, and the flat portion, and the portion where fine noise exists have a tendency as follows.

(1) Edge portion: the luminance variation value is large, and the angular variation value is small.
(2) Texture portion: the luminance variation value is large, and the angular variation value is also large.
(3) Flat portion: the luminance variation value is small, and the angular variation value is also small.
(4) Fine noise: the luminance variation value is small, and the angular variation value is large.

FIG. 3 is a diagram schematically illustrating contour directions θ by arrows repeatedly in an image region Img1 including an edge portion and an image region Img2 including a texture portion.

As can be understood from FIG. 3, in the edge portion, the contour direction θ has a tendency that the contour direction is aligned in a predetermined direction, and on the other hand, in the texture portion, the contour direction θ has a tendency that the contour direction is scattered. Namely, in the edge portion, the angular variation value has a tendency that the value is small, and in the texture portion, the angular variation value has a tendency that the value is large.

Therefore, as described above, in the texture portion, since the luminance variation value Yv and the angular variation value Av become large, the value Det_txt of the texture detection signal also becomes large. Namely, the texture portion on the image can be appropriately detected according to the value Det_txt of the texture detection signal. For example, in a case where the value Det_txt(x, y) of the texture detection signal is larger than a predetermined threshold value Th1, it can be determined that the pixel of interest (x, y) is included in the texture portion. In addition, in a case where the luminance variation value and the angular variation value are two-level values (binary signal), when the value Det_txt(x, y) of the texture detection signal is "1", it can be determined that the pixel of interest is included in the texture portion, so that the above-described determination process according to the threshold value is unnecessary.

The texture detection signal Det_txt acquired by the first multiplier 31 is output to the image processing unit 4.

In addition, in a case where the luminance variation value and the angular variation value are two-level values (binary signal), the texture detection signal Det_txt is also output as a binary signal to the image processing unit 4.

The reversing unit 32 acquires a reversed value Av_r of the angular variation value from the angular variation value Av.

More specifically, if the range that can be taken by the angular variation value Av is 0 to Max1, that is, 0≤Av≤Max1, the reversing unit 32 acquires the reversed value Av_r of the angular variation value by the following equation.

$$Av\_r = Max1 - Av$$

In addition, in a case where the luminance variation value and the angular variation value are two-level values (binary signal), by reversing the angular variation value Av, the reversed value Av_r of the angular variation value can be acquired.

Then, the acquired reversed value Av_r of the angular variation value is output to the second multiplier 33.

In addition, in a case where luminance variation value and the angular variation value are two-level values (binary signal), the reversed value Av_r of the angular variation value is also output as a binary signal to the second multiplier 33.

The second multiplier 33 acquires the edge detection signal Det_edge by multiplying the luminance variation value Yv output from the luminance variation detection unit 1 and the reversed value Av_r of the angular variation value output from the reversing unit 32 for each pixel.

More specifically, the second multiplier 33 acquires the value Det_edge(x, y) of the edge detection signal of the pixel of interest (x, y) by the following equation.

$$Det\_edge(x,y) = Yv(x,y) \times Av\_r(x,y)$$

In the edge portion of the image, since the luminance variation value Yv has a tendency that the value is large and the angular variation value Av has a tendency that the value is small, the luminance variation value Yv becomes large, and the reversed value Av_r of the angular variation value becomes large.

Namely, the edge portion on the image can be appropriately detected according to the value Det_edge of the edge detection signal. For example, in a case where the value Det_edge(x, y) of the edge detection signal is larger than a predetermined threshold value Th2, it can be determined that the pixel of interest (x, y) is included in the edge portion. In addition, in a case where the luminance variation value and the angular variation value are two-level values (binary signal), when the value Det_edge(x, y) of the edge detection signal is "1", it can be determined that the pixel of interest is included in the edge portion, so that the above-described determination process according to the threshold value is unnecessary.

The edge detection signal Det_edge acquired by the second multiplier 33 is output to the image processing unit 4.

In addition, in a case where the luminance variation value and the angular variation value are two-level values (binary signal), the edge detection signal Det_edge is also output as a binary signal to the image processing unit 4.

The image processing unit 4 performs, for example, a noise reduction process on the image signal (video signal) Din based on the texture detection signal Det_txt and the edge detection signal Det_edge.

The noise reduction processing unit 411 performs the noise reduction process on the image signal Din. Then, the noise-reduction-processed image signal is output as an image signal D_NR to the combination unit 413.

The combination ratio determination unit 412 determines the combination ratio α based on the texture detection signal Det_txt and the edge detection signal Det_edge.

More specifically, the combination ratio determination unit determines the combination ratios as follows. In addition, it is assumed that $0 \leq \alpha \leq 1$.

(1) In a case where the value of the texture detection signal Det_txt is larger than a predetermined threshold value (when the texture detection signal is a binary signal, in a case where the texture detection signal Det_txt is "1"), α is set to a value αt approximate to "0" (may be set to αt=0).

(2) In a case where the value of the edge detection signal Det_edge is larger than a predetermined threshold value (when the edge detection signal is a binary signal, in a case where the edge detection signal Det_edge is "1"), α is set to a value αe approximate to "1" (may be set to αe=1).

(3) In a case where both of the above conditions (1) and (2) are satisfied, α is set as follows.

$$\alpha = (\alpha t + \alpha e)/2$$

(4) In the case other than the cases (1) to (3), α is set to "0".

The combination ratio α determined in the above method is output to the combination unit 413.

The combination unit 413 acquires the image signal Dout by combining the image signal Din and the noise-reduction-processed image signal D_NR by a process (internal division process) corresponding to, for example, the following equation according to the combination ratio α.

$$Dout = \alpha \times D\_NR + (1-\alpha) \times Din$$

$0 \leq \alpha \leq 1$ (1) In the case of α=αt (in a case where it is determined as the texture portion), since αt is a value approximate to "0", the image signal Dout becomes a signal almost approximate to the image signal Din. Namely, in the texture portion, the noise reduction process is not almost performed. Therefore, in the text portion of the image formed according to the image signal Dout, a feeling of detail is retained.

(2) In the case of α=αe (in a case where it is determined as the edge portion) since αe is a value approximate to "1", the image signal Dout becomes a signal almost approximate to the image signal D_NR. Namely, in the edge portion, the noise reduction process with a high intensity is performed. Therefore, in the edge portion of the image formed according to the image signal Dout, jaggies, mosquito noise, or the like are appropriately reduced.

(3) In a case where the value of the texture detection signal Det_txt is larger than a predetermined threshold value, and on the other hand, in a case where the value of the edge detection signal Det_edge is larger than a predetermined threshold value (in a case where both of the above conditions (1) and (2) are satisfied), since α=(αt+αe)/2, a combination process according to a middle combination ratio α between the cases (1) and (2) is performed. In general, although there are not many cases corresponding to (3), according to some methods of setting the threshold value, there may be the case corresponding to (3). Even in this case, the combination unit 413 performs the combination process according to the middle combination ratio α between the cases (1) and (2). As a result, even in the case corresponding to (3), the image signal Dout on which the noise reduction process is appropriately performed can be acquired.

(4) In the case other than the cases (1) to (3), since α is "0", the combination unit 413 acquires the same image signal Dout as the image signal Din.

As described above, in the image processing device 1000, since the edge portion and the texture portion are separated by taking into consideration both of the luminance variation value Yv and the angular variation value Av, for example, even in a case where contrast of the luminance value or the like of the input image signal (video signal) is greatly changed, the edge portion and the texture portion can be appropriately separated. In a case where contrast of the luminance value or the like of the input image signal (video signal) is greatly changed, when the edge portion and the texture portion are to be separated by using only the luminance variation value Yv, in some cases, erroneous determination may be made. In the image processing device 1000, by taking into consideration the angular variation value Av as well as the luminance variation value Yv, the property of the image region is determined, namely, it is determined whether the image region is an edge portion or a texture portion. Since the angular variation value is not easily influenced by a change in contrast value of the image signal, in the image processing device 1000, the edge portion and the texture portion are separated by taking into consideration the angular variation value Av as well as the luminance variation value Yv. Therefore, in the image processing device 1000, even in a case where contrast of the luminance value or the like of the input image signal (video signal) is greatly changed, the edge portion and the texture portion can be appropriately separated. Then, the image processing device 1000 can perform appropriate respective image processes on the appropriately separated edge portion and texture portion.

EXAMPLE

Figure 4:
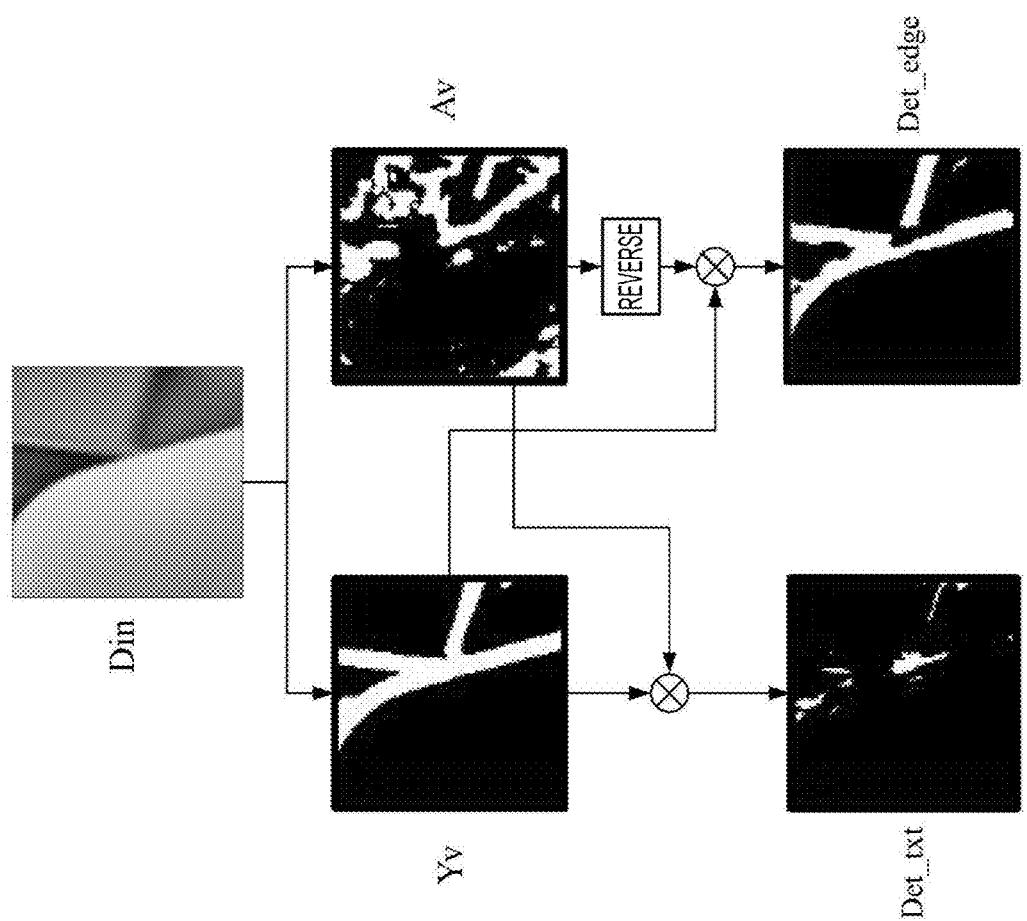
FIG. 4 is a diagram illustrating an example of a result of a process by the image processing device 1000.
Figure 5:
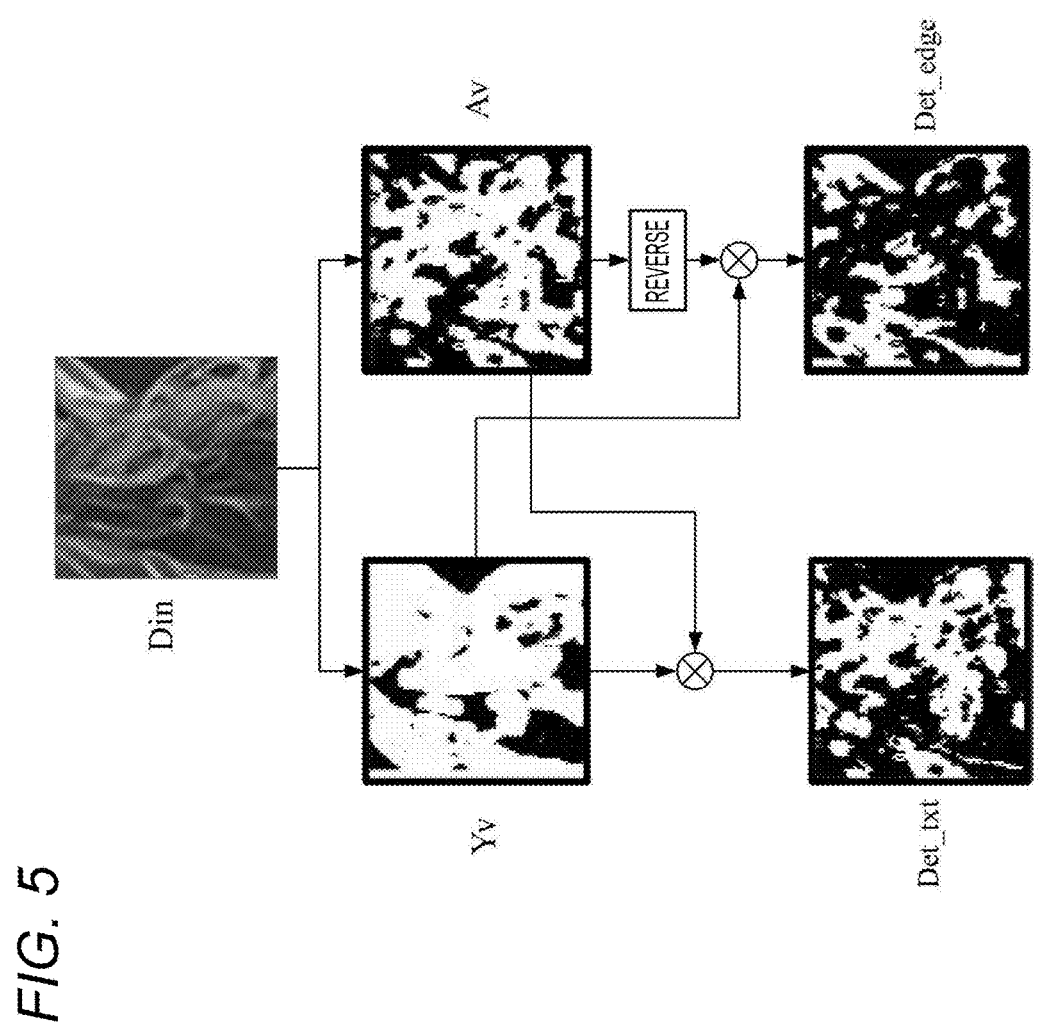
FIG. 5 is a diagram illustrating an example of a result of a process by the image processing device 1000.

FIGS. 4 and 5 illustrate examples of results of the process by the image processing device 1000.

FIG. 4 is a diagram illustrating as images the input image signal Din, the luminance variation value Yv, the angular variation value Av, the texture detection signal Det_txt, and the edge detection signal Det_edge of the time when the image region Img1 of FIG. 3 is input.

FIG. 5 is a diagram illustrating as images the input image signal Din, the luminance variation value Yv, the angular variation value Av, the texture detection signal Det_txt, and the edge detection signal Det_edge of the time when the image region Img2 of FIG. 3 is input.

In addition, in the images representing the luminance variation value Yv, the angular variation value Av, the texture detection signal Det_txt, and the edge detection signal Det_edge, white portions indicate portions of which the values are large. In addition, in order to clarify the portions of which the values are large (or detection portions), the images are illustrated as two-level-valued images.

As can be understood from FIG. 4, in the edge portion, the luminance variation value Yv is large, and the angular variation value Av is small. Therefore, it can be understood that in the image representing the edge detection signal Det_edge obtained by multiplying the luminance variation value Yv and the value obtained by reversing the angular variation value the edge portion is appropriately extracted.

In addition, as can be understood from FIG. 5, in the texture portion, the luminance variation value Yv is large, and the angular variation value Av is also large. Therefore, it can be understood that, in the image representing the texture detection signal Det_txt acquired by multiplying the luminance variation value Yv and the angular variation value, the texture portion is appropriately extracted.

As described above, in the image processing device 1000, the edge portion and the texture portion can be appropriately separated by taking into consideration both of the luminance variation value Yv and the angular variation value Av.

First Modified Example

Next, a first modified example of the first embodiment will be described.

In addition, hereinafter, characteristic aspects of the modified example are described; and the same components as those of the first embodiment are denoted by the same reference numerals, and the detailed description thereof is omitted.

Figure 6:
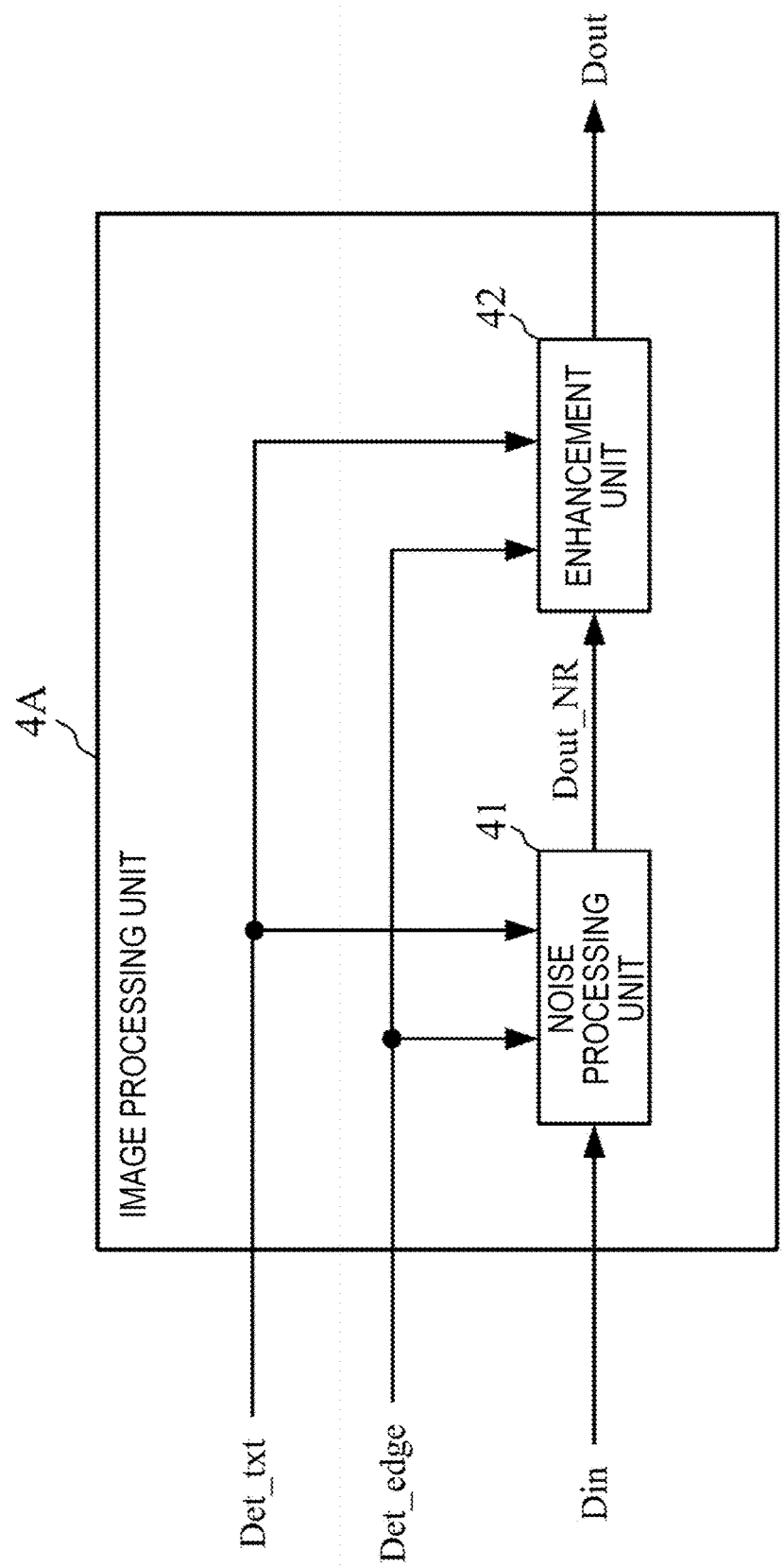
FIG. 6 is a schematic configuration diagram of an image processing unit 4A according to a first modified example of the first embodiment.

FIG. 6 illustrates a schematic configuration diagram of an image processing unit 4A according to the modified example.

Figure 7:
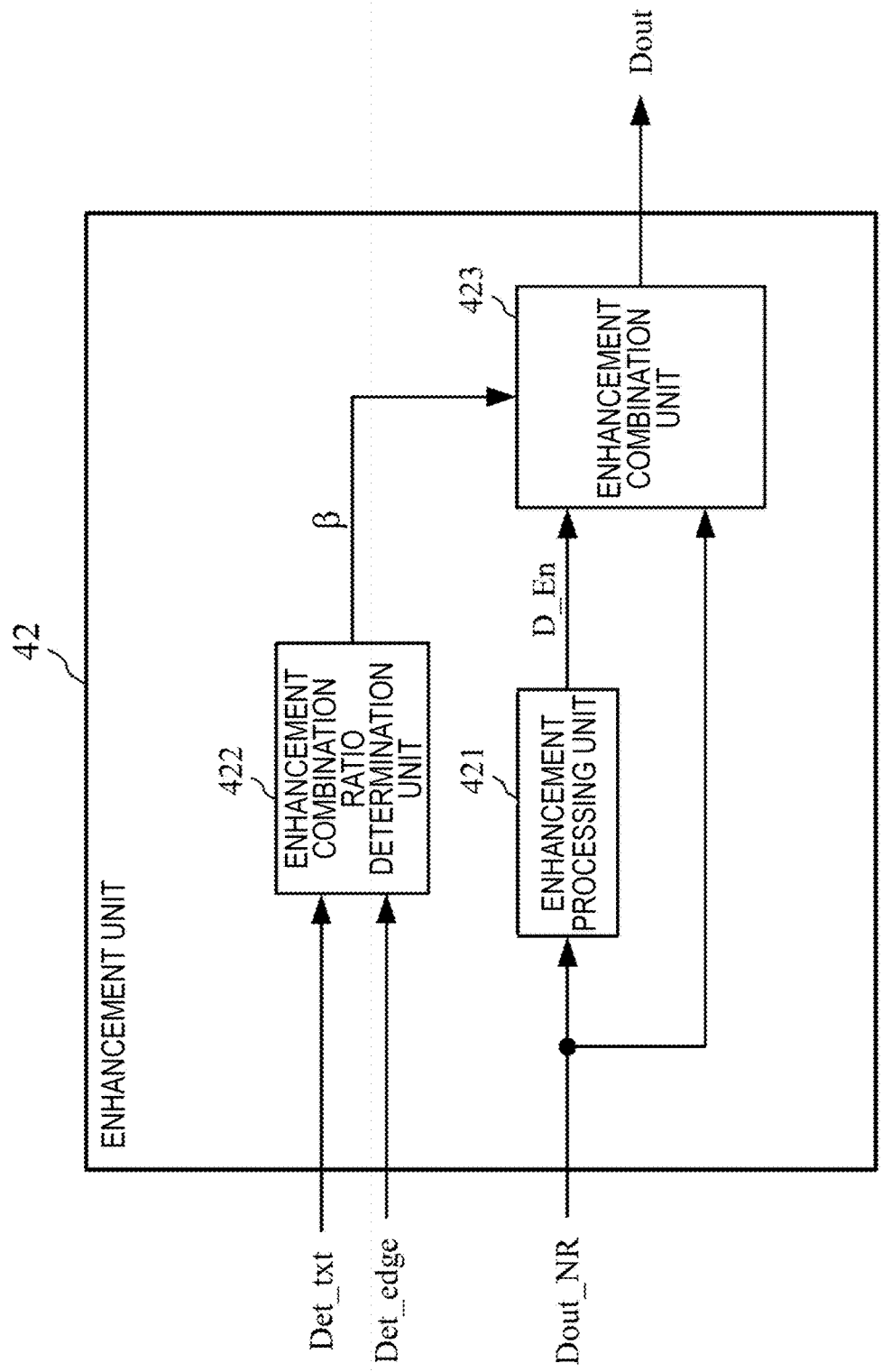
FIG. 7 is a schematic configuration diagram of an enhancement unit 42 according to the first modified example of the first embodiment.

FIG. 7 illustrates a schematic configuration diagram of an enhancement unit 42 according to the modified example.

The image processing device according to the modified example has a configuration where, in the image processing device 1000 according to the first embodiment, the image processing unit 4 is replaced with an image processing unit 4A. With respect to the other configurations, the image processing device according to the modified example is the same as the image processing device 1000 according to the first embodiment.

As illustrated in FIG. 6, the image processing unit 4A is configured to include a noise processing unit 41 and an enhancement unit 42.

The noise processing unit 41 is the same as the noise processing unit 41 according to the first embodiment.

As illustrated in FIG. 7, the enhancement unit 42 is configured to include an enhancement processing unit 421, an enhancement combination ratio determination unit 422, and an enhancement combination unit 423.

The enhancement processing unit 421 is input with the image signal output from the combination unit 413 of the noise processing unit 41 as the image signal Dout_NR. Then, the enhancement processing unit performs an enhancement process (for example, a high frequency component emphasis process or a detail emphasis process) on the image signal Dout_NR and outputs the processed image signal as the image signal D_En to the enhancement combination unit 423.

The enhancement combination ratio determination unit 422 is input with the texture detection signal Det_txt and the edge detection signal Det_edge output from the image region detection unit 3 and determines the enhancement combination ratio β based on the texture detection signal Det_txt and the edge detection signal Det_edge.

More specifically, the enhancement combination ratio determination unit determines the combination ratio β as follows. In addition, it is assumed that $0 \leq \beta \leq 1$.

(1) In a case where the value of the texture detection signal Det_txt is larger than a predetermined threshold value (when the texture detection signal is a binary signal, in a case where the texture detection signal Det_txt is "1"), β is set to a value βt approximate to "1".

(2) In a case where the value of the edge detection signal Det_edge is larger than a predetermined threshold value (when the edge detection signal is a binary signal, in a case where the edge detection signal Det_edge is "1"), β is set to a value βe approximate to "1".

(3) In a case where both of the above conditions (1) and (2) are satisfied, β is set as follows.

$$\beta = (\beta t + \beta e)/2$$

(4) In the case other than the cases (1) to (3), β is set to "0".

The enhancement combination ratio β determined in the above method is output to the enhancement combination unit 423.

The enhancement combination unit 423 is input with the image signal Dout_NR output from the combination unit 413 of the noise processing unit 41, the image signal D_En output from the enhancement processing unit 421, and the combination ratio β output from the enhancement combination ratio determination unit 422. The enhancement combination unit 423 combines the image signal Dout_NR and the image signal D_En based on the enhancement combination ratio θ.

More specifically, the enhancement combination unit 423 combines the image signal Dout_NR and the image signal D_En by performing a process (internal division process) corresponding to, for example, the following equation according to the enhancement combination ratio β.

$$Dout = \beta \times D\_En + (1-\beta) \times Dout\_NR$$

$$0 \leq \beta \leq 1$$

(1) In the case of β=βt (in a case where it is determined as the texture portion), since βt is a value approximate to "1", the image signal Dout becomes a signal almost approximate to the image signal D_En. Namely, in the texture portion, the enhancement process with a high intensity is performed. Therefore, in the texture portion of the image formed according to the image signal Dout, a feeling of detail (feeling of fineness) is emphasized.

(2) In a case where β=βe (in a case where it is determined as the edge portion), since βe is a value approximate to "1", the image signal Dout becomes a signal almost approximate to the image signal D_En. Namely, in the edge portion, the enhancement process with a high intensity is performed. Therefore, in the edge portion of the image formed according to the image signal Dout, the high frequency emphasis is performed, so that the edge is further sharpened.

In addition, in the image processing device according to the modified example, since jaggies or mosquito noise are reduced in the edge portion by the previous-stage noise processing unit 41, the enhancement unit 42 performs the enhancement process on the image signal corresponding to the edge portion, so that the edge can be appropriately emphasized while reducing jaggies, mosquito noise, or the like.

(3) In a case where the value of the texture detection signal Det_txt is larger than a predetermined threshold value, and on the other hand, in a case where the value of the edge detection signal Det_edge is larger than a predetermined threshold value (in a case where both of the above conditions (1) and (2) are satisfied), since β=(βt+βe)/2, a combination process according to a middle combination ratio β between the cases (1) and (2) is performed. Even in this case, in the image processing device according to the modified example, the enhancement process is appropriately performed.

(4) In the case other than the cases (1) to (3), since β is "0", the enhancement combination unit 423 acquires the same image signal Dout as the image signal Dout_NR.

As described above, in the image processing device according to the modified example, similarly to the image processing device 1000 according to the first embodiment, the edge portion and the texture portion can be appropriately separated by taking into consideration both of the luminance variation value Yv and the angular variation value Av. Then, in the image processing device according to the modified example, appropriate respective noise reduction process and enhancement process can be performed on the appropriately separated edge and texture portions.

Second Modified Example

Next, a second modified example of the first embodiment will be described.

In addition, hereinafter, characteristic aspects of the modified example are described; and the same components as those of the first embodiment are denoted by the same reference numerals, and the detailed description thereof is omitted.

Although, in the first embodiment, the luminance variation detection unit 1 calculates the variation value of the h luminance value, in the image processing device according to the modified example, the luminance variation detection unit 1 calculates an average value of differential absolute values of the luminance value.

More specifically, the luminance variation detection unit 1 according to the modified example acquires an approximate luminance variation value Yv(x, y) (average value Yv(x, y) of the differential absolute values of the luminance value) by performing a process corresponding to the following Mathematical Formula 7.

[Mathematical Formula 7]

$$Yv(x, y) = \frac{1}{(2n+1)^2} \sum_{j=-n}^{n} \sum_{i=-n}^{n} \text{abs}(P(x+i, y+j) - P\_ave(x, y)) \quad (7)$$

$$P\_ave(x, y) = \frac{1}{(2n+1)^2} \sum_{j=-n}^{n} \sum_{i=-n}^{n} P(x+i, y+j)$$

In addition, abs(z) is a function acquiring an absolute value of a value z.

Then, the luminance variation detection unit 1 outputs the acquired value Yv(x, y) to the image region detection unit 3.

In addition, the luminance variation detection unit 1 may be configured so as to output the luminance variation value Yv as a binary signal. Namely, if a predetermined threshold value is denoted by Th_Yv, the luminance variation detection unit 1 may output to the first multiplier 31 and the second multiplier 33 the luminance variation value Yv as follows:

(1) when Yv(x, y)≥Th_Yv, Yv(x, y)=1; and (2) when Yv(x, y)<Th_Yv, Yv(x, y)=0.

In addition, although, in the first embodiment, the angular variation detection unit 2 calculates the variation value of the value of the quantization contour direction A(x, y), in the image processing device according to the modified example, the angular variation detection unit 2 calculates an average value of differential absolute values of the quantization contour direction A(x, y).

More specifically, in the angular variation detection unit 2 according to the modified example acquires an approximate angular variation value Av(x, y) (average value Av(x, y) of differential absolute values of the values of the quantization contour direction A(x, y)) by performing a process corresponding to the following Mathematical Formula 8.

[Mathematical Formula 8]

$$Av(x, y) = \frac{1}{(2n+1)^2} \sum_{j=-n}^{n} \sum_{i=-n}^{n} \text{abs}(A(x+i, y+j) - A\_ave(x, y)) \quad (8)$$

$$A\_ave(x, y) = \frac{1}{(2n+1)^2} \sum_{j=-n}^{n} \sum_{i=-n}^{n} A(x+i, y+j)$$

Then, the angular variation detection unit 2 outputs the acquired value Av(x, y) to the image region detection unit 3.

In addition, the angular variation detection unit 2 may be configured so as to output the angular variation value Av as a binary signal. Namely, if a predetermined threshold value is denoted by Th_Av, the angular variation detection unit 2 may output to the first multiplier 31 and the reversing unit 32 the angular variation value Av as follows:

(1) when Av(x, y)≥Th_Av, Av(x, y)=1; and (2) when Av(x, y)<Th_Av, Av(x, y)=0.

As described above, in the image processing device according to the modified example, the luminance variation value Yv is replaced with the average value of differential absolute values of the luminance value, and the angular variation value Av is replaced with the average value of differential absolute values of the values of the quantization contour direction A(x, y). Therefore, in the image processing device according to the modified example, the processes of the luminance variation detection unit 1 and the angular variation detection unit 2 can be performed with a calculation amount which is smaller than that of the case of calculating the variation value. Therefore, in the image processing device according to the modified example, while suppressing the calculation amount, by taking into consideration both of the luminance variation value Yv and the angular variation value Av, similarly to the above-described embodiment, the edge portion and the texture portion can be appropriately separated, and appropriate respective image processes can be performed on the separated image regions.

Second Embodiment

Next, a second embodiment will be described.

In addition, hereinafter, characteristic aspects of the embodiment are described; and the same components as those of the above-described embodiment are denoted by the same reference numerals, and the detailed description thereof is omitted.

Figure 8:
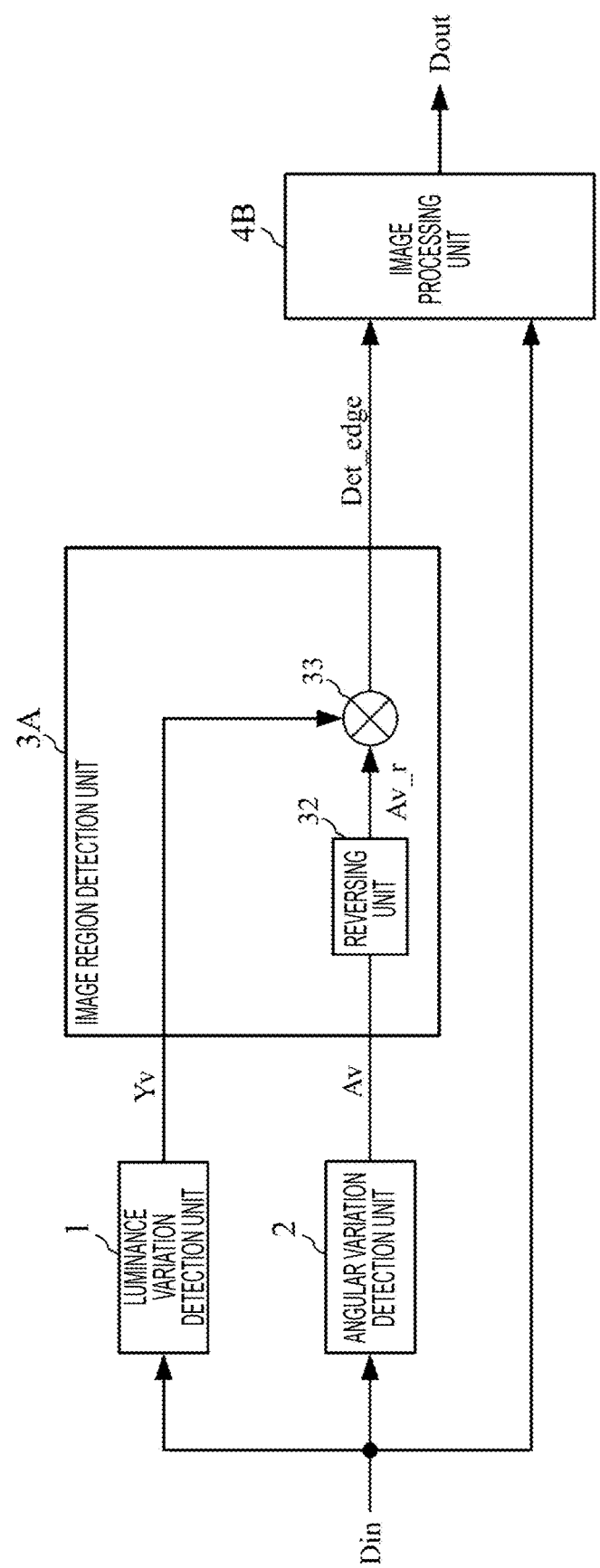
FIG. 8 is a schematic configuration diagram of an image processing device 2000 according to a second embodiment.

FIG. 8 illustrates a schematic configuration diagram of an image processing device 2000 according to the embodiment.

Figure 9:
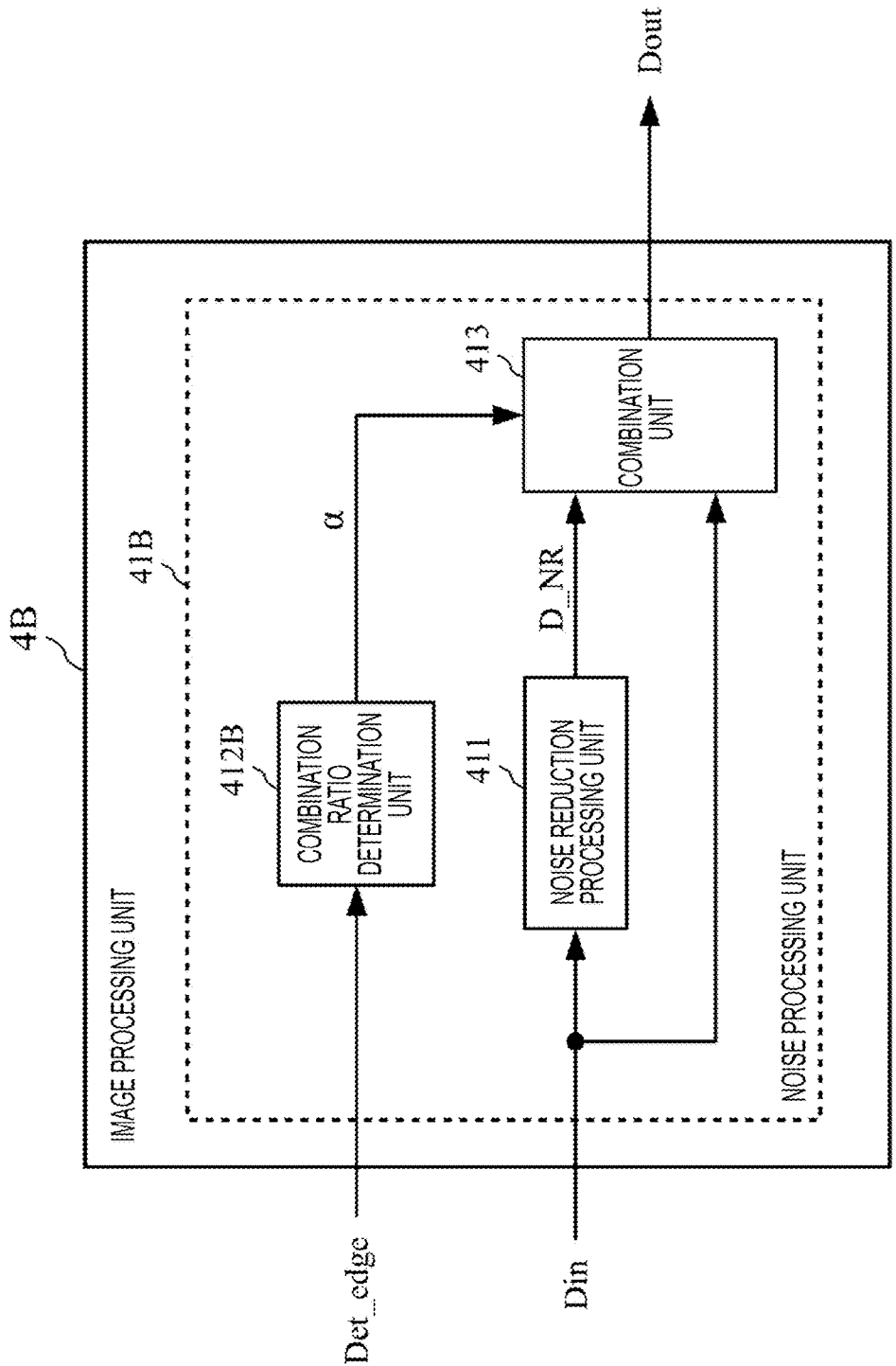
FIG. 9 is a schematic configuration diagram of an image processing unit 4B according to the second embodiment.

FIG. 9 illustrates a schematic configuration diagram of an image processing unit 4B according to the embodiment.

The image processing device 2000 according to the embodiment has a configuration where, in the image processing device 1000 according to the first embodiment, the image region detection unit 3 is replaced with an image region detection unit 3A, and the image processing unit 4 is replaced with an image processing unit 4B. With respect to the other configurations, the image processing device 2000 according to the embodiment is the same as the image processing device 1000 according to the first embodiment.

As illustrated in FIG. 8, the image region detection unit 3A has a configuration where the first multiplier 31 is removed from the image region detection unit 3 according to the first embodiment. Namely, although the image region detection unit 3 acquires the texture detection signal Det_txt and the edge detection signal Det_edge, the image region detection unit 3A acquires only the edge detection signal Det_edge.

The image region detection unit 3A outputs the acquired edge detection signal Det_edge to the image processing unit 4B.

As illustrated in FIG. 9, the image processing unit 4B is configured to include a noise reduction processing unit 411, a combination ratio determination unit 412B, and a combination unit 413.

The noise reduction processing unit 411 and the combination unit 413 are the same as those of the first embodiment.

The combination ratio determination unit 412B is input with the edge detection signal Det_edge output from the image region detection unit 3A and determines combination ratio α based on the input edge detection signal Det_edge.

More specifically, the combination ratio determination unit 412B determines the combination ratio α as follows. In addition, it is assumed that 0≤α≤1.

(1) In a case where the value of the edge detection signal Det_edge is larger than a predetermined threshold value (when the edge detection signal is a binary signal, in a case where the edge detection signal Det_edge is "1") α is set to a value αe approximate to "1".

(2) In the case other than the case (1), α is set to "0".

The combination ratio α determined in the above method is output to the combination unit 413.

Then, the combination unit 413 acquires the image signal Dout by combining the image signal Din and the noise-reduction-processed image signal D_NR by a process (internal division process) corresponding to, for example, the following equation according to the combination ratio α.

$$Dout = \alpha \times D\_NR + (1-\alpha) \times Din$$

$$0 \leq \alpha \leq 1$$

(1) In the case of α=αe (in a case where it is determined as the edge portion) since αe is a value approximate to "1", the image signal Dout becomes a signal almost approximate to the image signal D_NR. Namely, in the edge portion, the noise reduction process with a high intensity is performed. Therefore, in the edge portion of the image formed according to the image signal Dout, jaggies, mosquito noise, or the like are appropriately reduced.

(2) In the case other than the case (1), since α is "0", in the combination unit 413, the same image signal Dout as the image signal Din is acquired.

As described above, in the image processing device 2000, since the edge portion can be separated (detected) by taking into consideration both of the luminance variation value Yv and the angular variation value Av, for example, even in a case where contrast of the luminance value or the like of the input image signal (video signal) is greatly changed, the edge portion can be appropriately separated (detected). In a case where contrast of the luminance value or the like of the input image signal (video signal) is greatly changed, when the edge portion is to be separated (detected) by using only the luminance variation value Yv, in some cases, erroneous determination may be made. In the image processing device 2000, by taking into consideration the angular variation value Av as well as the luminance variation value Yv, the property of the image region is determined, namely, it is determined whether or not the image region is an edge portion. Since the angular variation value is not easily influenced by a change in contrast value of the image signal, in the image processing device 2000, the edge portion is separated (detected) by taking into consideration the angular variation value Av as well as the luminance variation value Yv. Therefore, in the image processing device 2000, even in a case where contrast of the luminance value or the like of the input image signal (video signal) is greatly changed, the edge portion can be appropriately separated (detected). Then, the image processing device 2000 can perform an appropriate image process on the appropriately separated (detected) edge portion.

In addition, in the image processing device 2000, since the portion where the texture detection signal Det_txt is to be detected is removed from the image processing device 1000 according to the first embodiment, the cost for implementation can be reduced in comparison with the image processing device 1000 according to the first embodiment.

Third Embodiment

Next, a third embodiment will be described.

In addition, hereinafter, characteristic aspects of the embodiment are described; and the same components as those of the above-described embodiment are denoted by the same reference numerals, and the detailed description thereof is omitted.

<3.1: Configuration of Image Processing Device>

Figure 10:
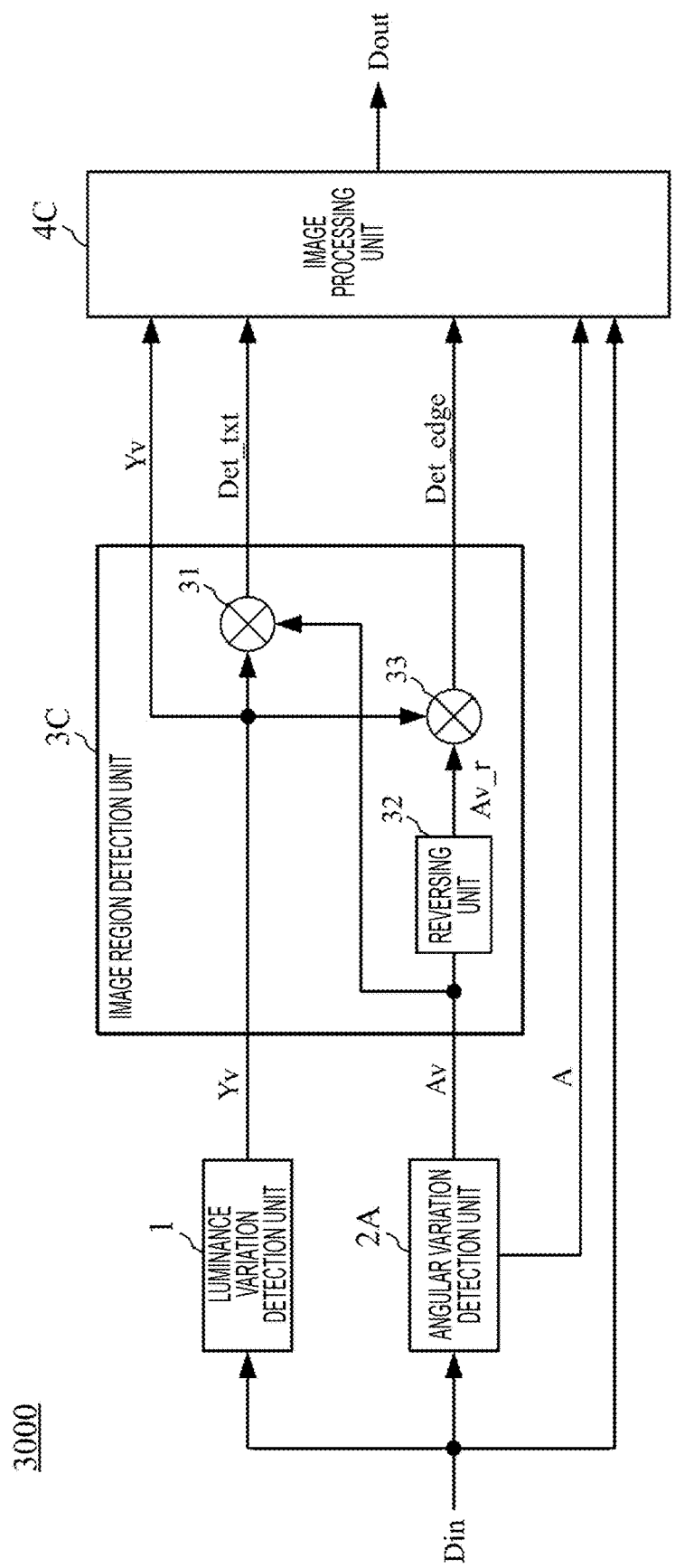
FIG. 10 is a schematic configuration diagram of an image processing device 3000 according to a third embodiment.

FIG. 10 illustrates a schematic configuration diagram of an image processing device 3000 according to a third embodiment.

Figure 11:
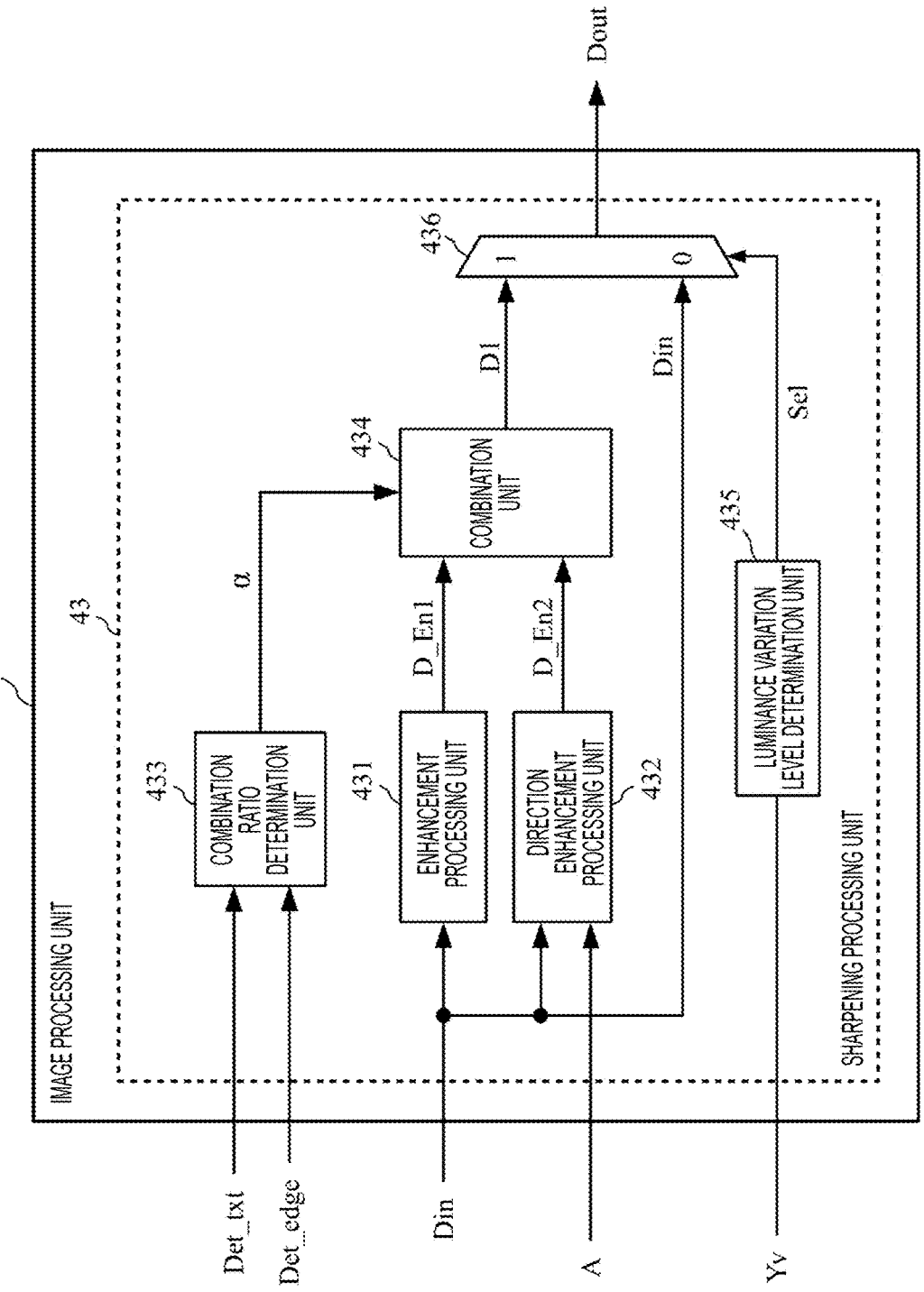
FIG. 11 is a schematic configuration diagram of an image processing unit 4C according to the third embodiment.

FIG. 11 illustrates a schematic configuration diagram of an image processing unit 4C according to the third embodiment.

Figure 12:
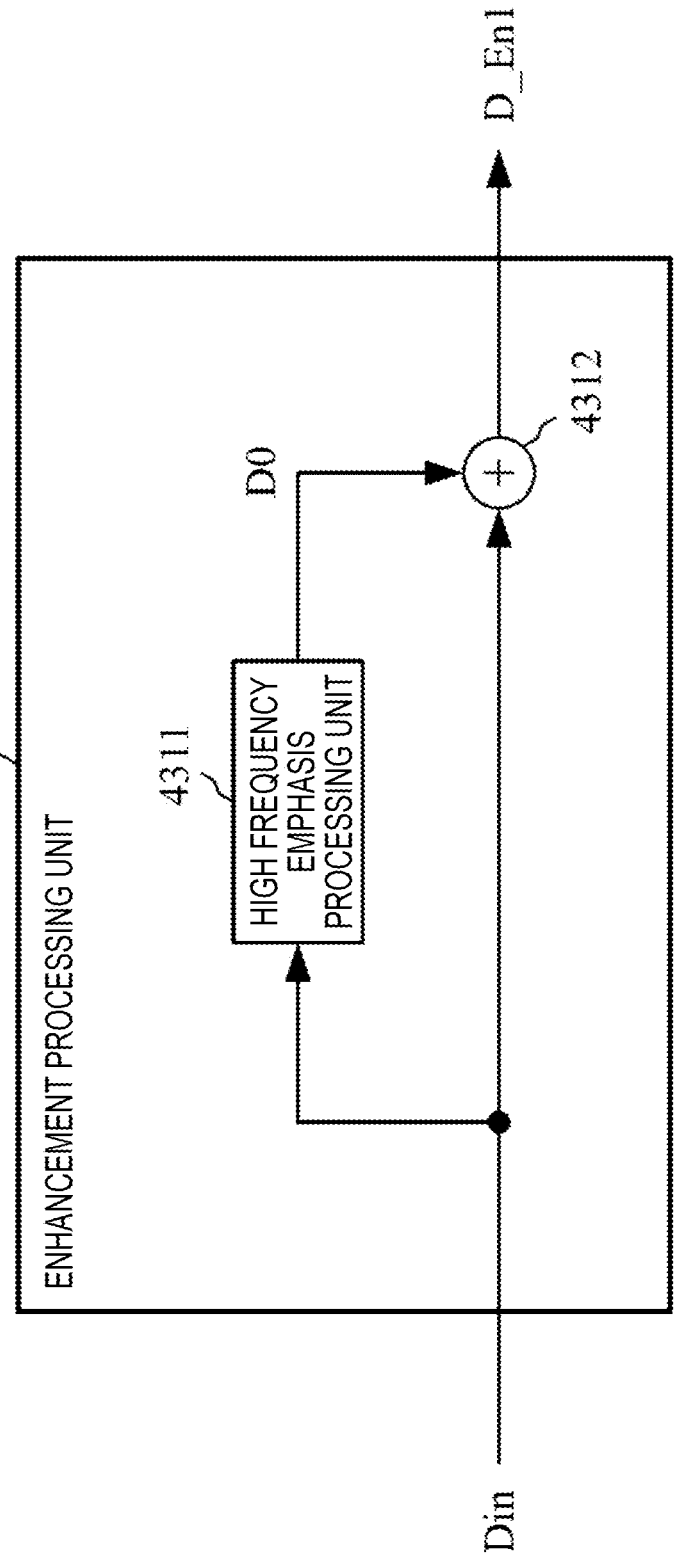
FIG. 12 is a schematic configuration diagram of an enhancement processing unit 431 according to the third embodiment.

FIG. 12 illustrates a schematic configuration diagram of an enhancement processing unit 431 according to the third embodiment.

Figure 13:
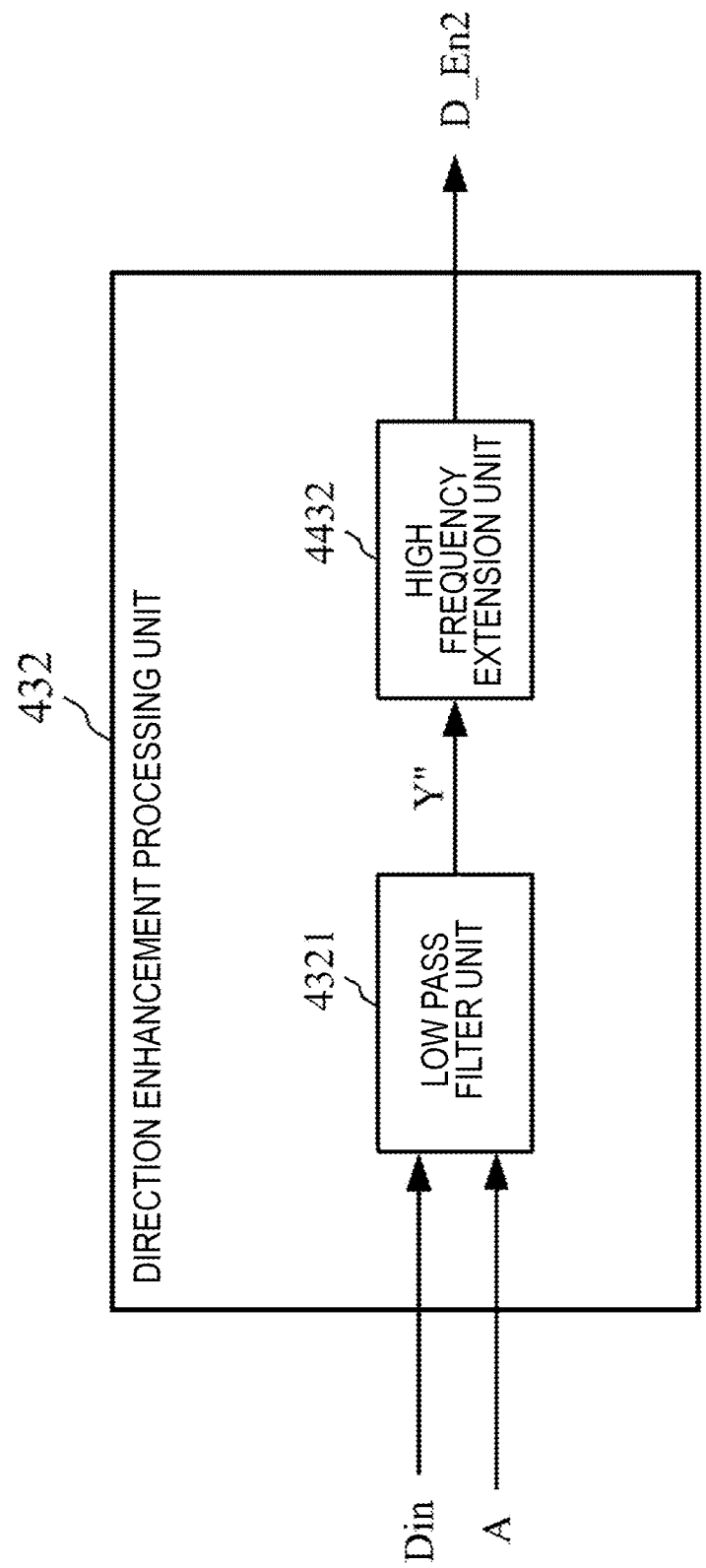
FIG. 13 is a schematic configuration diagram of a direction enhancement processing unit 432 according to the third embodiment.

FIG. 13 illustrates a schematic configuration diagram of a direction enhancement processing unit 432 according to the third embodiment.

In the image processing device 3000 according to the embodiment, the image processing unit 4C performs a sharpening process.

In general, in a high resolution display device, 1920 pixels×1080 pixels image (video) can be displayed by performing an upscale process of an embedded scaler on an image (video) having a resolution lower than the display resolution. However, if a low-resolution image (video) is displayed as a high resolution image by the upscale process, in some cases, jaggies occur in the edge portion.

In addition, in the high resolution display device, in a case where a compressed image (video) is decoded to be displayed, in some cases, mosquito noise occurs in the edge portion.

If a sharpening process (for example, a sharpness emphasis process or an enhancement process) is performed on the image, jaggies or mosquito noise are overemphasized in the edge portion, so that there is a problem in that image quality is deteriorated.

Therefore, it is considered that a contour-direction-dependent low pass filter is introduced to reduce influence of aliasing in advance with respect to the signal influenced by aliasing, so that overemphasis on jaggies is suppressed.

If the same process is performed on all the images by this method, emphasis on jaggies can be suppressed, but in some cases, details of the texture such as a fine pattern are destructed.

In the embodiment, an image processing device 3000 capable of suppressing emphasis on jaggies in the edge portion and performing an appropriate enhancement process on the detail portion of the texture such as a fine pattern will be described.

As illustrated in FIG. 10, the image processing device 3000 has a configuration where, in the image processing device 1000 according to the first embodiment, the angular variation detection unit 2 is replaced with an angular variation detection unit 2A, the image region detection unit 3 is replaced with an image region detection unit 3C, and the image processing unit 4 is replaced with an image processing unit 4C.

The angular variation detection unit 2A has the same function as that of the angular variation detection unit 2. As illustrated in FIG. 10, the angular variation detection unit 2A outputs a quantization contour direction A(x, y) calculated by, for example, Mathematical Formula 5 to the image processing unit 4C. In terms of this point, the angular variation detection unit 2A is different from the angular variation detection unit 2.

As illustrated in FIG. 10, the image region detection unit 3C is configured by adding to the image region detection unit 3 a path through which the luminance variation value Yv output from the luminance variation detection unit 1 is output to the image processing unit 4C. With respect to the other configurations, the image region detection unit 3C is the same as the image region detection unit 3.

As illustrated in FIG. 11, the image processing unit 4C is configured to include an enhancement processing unit 431, a direction enhancement processing unit 432, a combination ratio determination unit 433, a combination unit 434, a luminance variation level determination unit 435, and a selector 436.

As illustrated in FIG. 12, the enhancement processing unit 431 is configured to include a high frequency emphasis processing unit 4311 and an adder 4312.

The high frequency emphasis processing unit 4311 is input with the image signal Din and extracts the high frequency component of the image signal to acquire the signal of which the high frequency component is emphasized. Then, the high frequency emphasis processing unit 4311 outputs the acquired signal to the adder 4312.

The adder 4312 is input with the image signal Din and signal output from the high frequency emphasis processing unit 4311 and adds the two signals to acquire the signal of which the high frequency component is emphasized, that is, the image signal on which the enhancement process is performed. Then, the adder 4312 outputs the acquired image signal as the image signal D_En1 to the combination unit 434.

As illustrated in FIG. 13, the direction enhancement processing unit 432 is configured to include a low pass filter unit 4321 and a high frequency extension unit 4432.

The lowpass filter unit 4321 is input with the image signal Din and the signal A representing the quantization contour direction A(x, y) output from the angular variation detection unit 2A. The low pass filter unit 4321 smoothens the pixel of interest based on the quantization contour direction A(x, y) by using the signal value relating to the reference pixel which is the contour direction of the pixel of interest or the direction approximate to the contour direction and of which the contour direction is the same as or approximate to that of the pixel of interest. The low pass filter unit 4321 outputs the reduction-filtering-processed signal Y" acquired by the above method to the high frequency extension unit 4432.

The high frequency extension unit 4432 is input with the reduction-filtering-processed signal Y" output from the low pass filter unit 4321 to calculate the high frequency component value based on the signal value represented by the input signal Y". The high frequency extension unit 4432 adds the calculated high frequency component value and the signal value represented by the input signal Y' to calculate the high frequency extension signal value. Then, the high frequency extension unit 4432 outputs an image signal representing the calculated high frequency extension signal value as an image signal D_En2 to the combination unit 434.

The combination ratio determination unit 433 is input with the texture detection signal Det_txt and the edge detection signal Det_edge output from the image region detection unit 3 and determines combination ratio α based on the texture detection signal Det_txt and the edge detection signal Det_edge. The combination ratio determination unit 433 outputs the determined combination ratio α to the combination unit 434. In addition, the combination ratio determination unit 433 determines the combination ratio α in the same manner as that of the combination ratio determination unit 412 according to the first embodiment.

The combination unit 434 is input with the image signal D_En1 output from the enhancement processing unit 431, the image signal D_En2 output from the direction enhancement processing unit 432, and the combination ratio α output from the combination ratio determination unit 433. The combination unit 434 combines the image signal D_En1 and the image signal D_En2 based on the combination ratio α and outputs the combined image signal as an image signal D1 to the selector 436.

The luminance variation level determination unit 435 is input with the luminance variation value Yv output from the image region detection unit 3C. (1) In a case where the input luminance variation value Yv is larger than a predetermined threshold value TH0, the luminance variation level determination unit 435 sets the select signal to "1" and outputs the select signal to the selector 436, and on the other hand, (2) in a case where the input luminance variation value Yv is equal to or smaller than a predetermined threshold value TH0, the luminance variation level determination unit sets the select signal to "0" and outputs the select signal to the selector 436.

The selector 436 is input with the image signal Din, the image signal D1 output from the combination unit 434, and the select signal output from the luminance variation level determination unit 435. (1) In a case where the select signal is "1", the selector 436 outputs the image signal D1 output from the combination unit 434 as the output image signal Dout, and on the other hand, (2) in a case where the select signal is "0", the selector outputs the input image signal Din as the output image signal Dout.

<3.2: Operation of Image Processing Device>

Hereinafter, operations of the image processing device 3000 having the above-described configuration will be described.

In addition, since the processes of the luminance variation detection unit 1 and the image region detection unit 3 are the same as those of the first embodiment, the description thereof is omitted. In addition, with respect to the processes of the angular variation detection unit 2A, only the process where the angular variation detection unit 2A outputs the quantization contour direction A(x, y) calculated by, for example, Mathematical Formula 5 to the image processing unit 4C is different from that of the angular variation detection unit 2. The other processes of the angular variation detection unit 2A are the same as those of the angular variation detection unit 2.

The high frequency emphasis processing unit 4311 of the enhancement processing unit 431 extracts the high frequency component of the image signal from the input image signal Din and acquires the signal of which the high frequency component is emphasized. For example, if the coordinate of the pixel of interest on the image is denoted by (x, y) and the pixel value (luminance value) of the pixel of interest (x, y) is denoted by P(x, y), the high frequency emphasis processing unit 4311 performs a vertical-direction filtering process of a filter operator [−1 2 −1] on the pixel of interest (x, y). Namely, if the filtering-processed pixel value of the pixel of interest is denoted by Dv(x, y), the high frequency emphasis processing unit 4311 acquires the image Dv of which the vertical-direction high frequency component is extracted and emphasized by performing a process corresponding to the following equation on the entire pixels.

$$Dv(x,y)=P(x,y-1)\times(-1)+P(x,y)\times 2+P(x,y+1)\times(-1)$$

In addition, the high frequency emphasis processing unit 4311 performs a horizontal-direction filtering process of a filter operator [−1 2 −1] on the pixel of interest (x, y). Namely, if the filtering-processed pixel value of the pixel of interest is denoted by Dh(x, y), the high frequency emphasis processing unit 4311 acquires the image Dh of which the horizontal-direction high frequency component is extracted and emphasized by performing a process corresponding to the following equation on the entire pixels.

$$Dh(x,y)=P(x-1,y)\times(-1)+P(x,y)\times 2+P(x+1,y)\times(-1)$$

Then, the high frequency emphasis processing unit 4311 acquires an image D0 by adding the image Dv and the image Dh acquired by the above processes. Namely, the high frequency emphasis processing unit 4311 acquires the image signal D0 of which the high frequency component is extracted from the image signal Din and emphasized by performing a process corresponding to the following equation on the entire pixels.

$$D0(x,y)=Dv(x,y)+Dh(x,y)$$

Then, the high frequency emphasis processing unit 4311 output the acquired image signal D0 to the adder 4312.

When the signal value of the image signal Din of the pixel of interest (x, y) is denoted by Din (x, y), the signal value of the image signal D0 of the pixel of interest (x, y) is denoted by D0(x, y), and the signal value of the image signal D_En1 of the pixel of interest (x, y) output from the adder 4312 is denoted by D_En(x, y), the adder 4312 performs a process corresponding to the following equation on the image signal Din and the image signal D0 output from the high frequency emphasis processing unit 4311.

$$D\_En1(x,y)=Din(x,y)+D0(x,y)$$

In addition, in the above process, an upper limit value and a lower limit value are provided so that the signal value (pixel value) D_En1 of the output signal becomes a signal within a predetermined range, and a clip process may be performed by the upper limit value and the lower limit value.

Namely, the adder 4312 acquires the image signal D_En of which the high frequency component is emphasized by the above-described process.

Then, the image signal D_En1 acquired by the above-described process is output to the combination unit 434.

Next, a process of the direction enhancement processing unit 432 will be described.

The low pass filter unit 4321 of the direction enhancement processing unit 432 smoothens the pixel of interest based on the signal representing the input quantization contour direction A(x, y) (quantization contour direction A(x, y) of the pixel of interest (x, y)) by using the signal value relating to the reference pixel which is the contour direction of the pixel of interest (x, y) or the direction approximate to the contour direction and of which the contour direction is the same as or approximate to that of the pixel of interest.

Since the smoothening process performs a smoothening process by using pixels having a strong correlation with the contour direction of the pixel of interest, for example, in the edge portion of the image, with respect the signal influenced by aliasing, the influence of the aliasing can be appropriately reduced. Namely, since the above-described smoothening process is performed by using pixels existing in the contour direction of the pixel of interest by taking into consideration the contour direction dependency, particularly, in the edge portion of the image, the influence of the aliasing can be appropriately suppressed.

The image signal (reduction-filtering-processed signal) Y″ on which the smoothening process is performed by taking into consideration the contour direction dependency is output to the high frequency extension unit 4432.

The high frequency extension unit 4432 calculates the high frequency component value based on the signal value represented by the input reduction-filtering-processed image signal Y″. The high frequency extension unit 4432 calculates the high frequency extension signal value by adding the calculated high frequency component value and the signal value represented by the input signal Y″. Then, the high frequency extension unit 4432 outputs the image signal representing the calculated high frequency extension signal value as the image signal D_En2 to the combination unit 434.

The combination unit 434 acquires the image signal D1 by combining the image signal D_En1 output from the enhancement processing unit 431 and the image signal D_En2 output from the direction enhancement processing unit by a process (internal division process) corresponding to, for example, the following equation according to the combination ratio α.

$$D1=(1-\alpha)\times D\_En1+\alpha\times D\_En2$$

$$0\leq\alpha\leq 1$$

(1) In the case of α=αt (in a case where it is determined as the texture portion) since αt is a value approximate to "0", the image signal D1 becomes a signal almost approximate to the image signal D_En1. Namely, in the texture portion, the image signal obtained by performing a process (general enhancement process) of the enhancement processing unit 431 is output as the image signal D1 to the selector 436. In the texture portion of the image formed according to the image signal D1, a feeling of detail is appropriately retained.

(2) In the case of α=αe (in a case where it is determined as the edge portion), since αe is a value approximate to "1", the image signal D1 becomes a signal almost approximate to the image signal D_En2. Namely, in the edge portion, the image signal obtained by performing a process (direction enhancement process) of the direction enhancement processing unit 432 is output as the image signal D1. In the edge portion of the image formed according to the image signal D1 jaggies, mosquito noise, or the like are appropriately reduced.

(3) In a case where the value of the texture detection signal Det_txt is larger than a predetermined threshold value, and on the other hand, in a case where the value of the edge detection signal Det_edge is larger than a predetermined threshold value (in a case where both of the above conditions (1) and (2) are satisfied), since α=(αt+αe)/2, a combination process according to a middle combination ratio α between the cases (1) and (2) is performed. In general, although there are not many cases corresponding to (3), according to some methods of setting the threshold value, there may be the case corresponding to (3). Even in this case, the combination unit 434 performs the combination process according to the middle combination ratio α between the cases (1) and (2). As a result, even in the case corresponding to (3), the image signal D1 on which the enhancement process is appropriately performed can be acquired.

In the luminance variation level determination unit 435, in a case where the input luminance variation value Yv is larger than a threshold value TH0, the select signal is set to "1" to be output to the selector 436. On the other hand, in a case where the input luminance variation value Yv is equal to or smaller than a predetermined threshold value TH0, the select signal is set to "0" to be output to the selector 436.

In the selector 436, in a case where the select signal is "1", the image signal D1 output from the combination unit 434 is output as the output image signal Dout. On the other than, in a case where the select signal is "0", the input image signal Din is output as the output image signal Dout.

Namely, in the image processing device 3000, in a case where the luminance variation value Yv is larger than a predetermined threshold value TH0, the image signal D1 acquired by the processes of the above cases (1) to (3) is acquired as the output image signal Dout. On the other than, in a case where the luminance variation value Yv is equal to or smaller than a predetermined threshold value TH0, that is, in a case where it is determined as the flat portion or the portion where the fine noise exists other than the edge portion and the texture portion, the enhancement process is not performed, the input image signal Din without a change is output as the output image signal Dout.

As described above, the image processing device 3000 can acquire the output image signal Dout (output image Dout) (1) by performing a process (general enhancement process) of the enhancement processing unit 431 on the texture portion of the image and (2) by performing a process (direction enhancement process) of the direction enhancement processing unit 432 on the edge portion of the image.

In the process (direction enhancement process) of the direction enhancement processing unit 432, in order to ensure a direction detection accuracy, a direction detection process (contour direction detection process) is performed in a range having some extent. Therefore, if the direction enhancement process is performed on the texture portion of the image by using the detected contour direction (quantization contour direction A(x, y)), originally, the pixels of which the contour direction (quantization contour direction A(x, y)) is varied look like to be melted on the image in the direction by the direction detection process. This is because, originally, the direction enhancement process is performed on the pixel group of which the contour direction (quantization contour direction A(x, y)) is varied according to the contour direction detected in a range having some extent, so that the high frequency components of the pixel group existing in the contour direction are aligned to be emphasized.

In the image processing device 3000, since the output image signal Dout on which a process (general enhancement process) of the enhancement processing unit 431 is performed on the texture portion of the image, as described above, there is no phenomenon that only the pixel group existing in a predetermined direction is unnaturally emphasized.

Therefore, in the image processing device 3000, even in a case where contrast of the luminance value or the like of the input image signal (video signal) is greatly changed, the edge portion and the texture portion are appropriately separated, so that the image process (enhancement process) can be appropriately performed. Namely, in the image processing device 3000, the direction enhancement process taking into consideration the direction dependency is performed on the edge portion, and a general enhancement process (high frequency emphasis process) not taking into consideration the direction dependency is performed on the texture portion, so that the enhancement process can be appropriately performed on the edge portion and the texture portion.

In addition, in the image processing device 3000, since it is determined based on the result of level determination of the luminance variation value Yv whether or not the above-described process is to be performed, in a case where it is determined as the flat portion or the portion where the fine noise exists other than the edge portion and the texture portion, the input image signal on which the enhancement process is not performed without a change may be output as the output image signal.

Fourth Embodiment

Next, a fourth embodiment will be described.

In addition, hereinafter, characteristic aspects of the embodiment are described; and the same components as those of the above-described embodiment are denoted by the same reference numerals, and the detailed description thereof is omitted.

Figure 14:
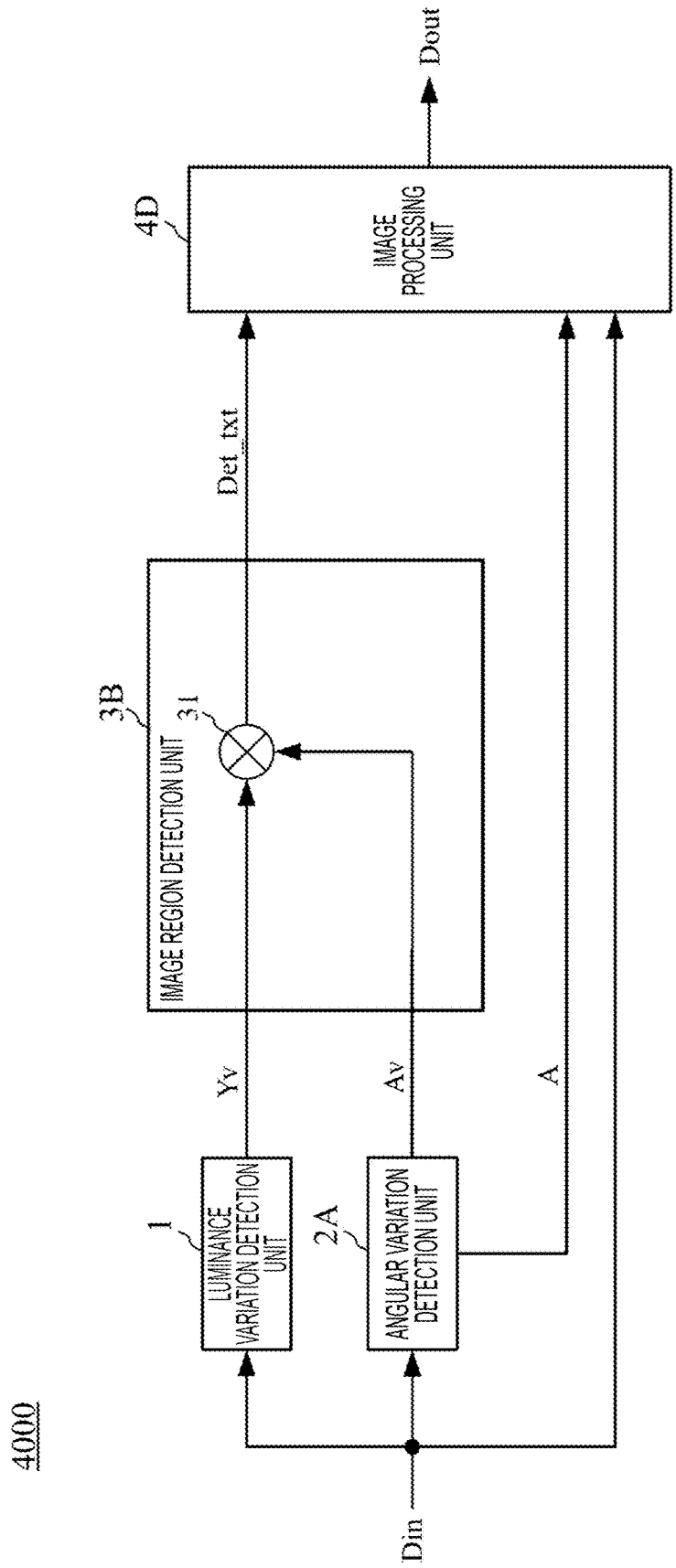
FIG. 14 is a schematic configuration diagram of an image processing device 4000 according to a fourth embodiment.

FIG. 14 illustrates a schematic configuration diagram of an image processing device 4000 according to a fourth embodiment.

Figure 15:
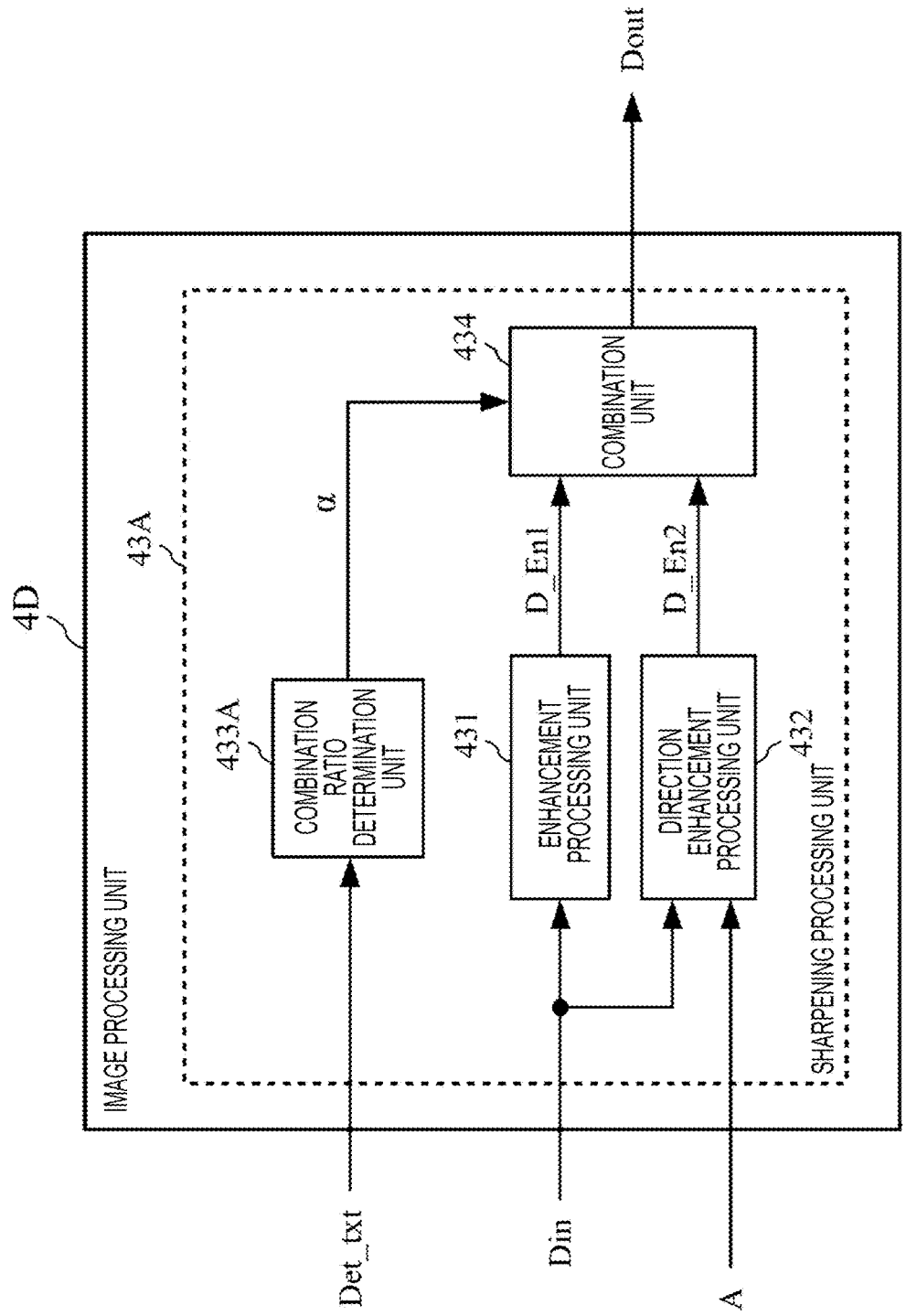
FIG. 15 is a schematic configuration diagram of an image processing unit 4D according to the fourth embodiment.

FIG. 15 illustrates a schematic configuration diagram of an image processing unit 4D according to the fourth embodiment.

The image processing device 4000 according to the embodiment has a configuration where, in the image processing device 3000 according to the third embodiment, the image region detection unit 3 is replaced with an image region detection unit 3B, and the image processing unit 4C is replaced with an image processing unit 4D. With respect to the other configurations, the image processing device 4000 according to the embodiment is the same as the image processing device 3000 according to the third embodiment.

As illustrated in FIG. 14, the image region detection unit 3B has a configuration where the reversing unit 32 and the second multiplier 33 are removed from the image region detection unit 3 according to the third embodiment. Namely, although the image region detection unit 3 acquires the texture detection signal Det_txt and the edge detection signal Det_edge, the image region detection unit 3B acquires only the texture detection signal Det_txt.

The image region detection unit 3B outputs the acquired texture detection signal Det_txt to the image processing unit 4D.

As illustrated in FIG. 15, the image processing unit 4D has a configuration where, in the image processing unit 4C according to the third embodiment, the combination ratio determination unit 433 is replaced with a combination ratio determination unit 433A. With respect to the other configurations, the image processing unit 4D is the same as the image processing unit 4C.

The combination ratio determination unit 433A is input with the texture detection signal Det_txt output from the image region detection unit 3B and determines combination ratio α based on the input texture detection signal Det_txt.

More specifically, the combination ratio determination unit 433A determines the combination ratio α as follows. In addition, it is assumed that $0 \leq \alpha \leq 1$.

(1) In a case where the value of the texture detection signal Det_txt is larger than a predetermined threshold value (when the texture detection signal is a binary signal, in a case where the texture detection signal Det_txt is "1"), α is set to a value αt approximate to "0" (may be set to αt=0).

(2) In the case other than the case (1), α is set to "1".

The combination ratio α determined in the above method is output to the combination unit 434.

Then, the combination unit 434 acquires the image signal Dout by combining the image signal D_En1 output from the enhancement processing unit 431 and the image signal D_En2 output from the direction enhancement processing unit 432 by a process (internal division process) corresponding to, for example, the following equation according to the combination ratio α.

$$Dout = (1-\alpha) \times D\_En1 + \alpha \times D\_En2$$
$$0 \leq \alpha \leq 1$$

(1) In a case where α=αt (in a case where it is determined as the texture portion), since αt is a value approximate to "0", the image signal Dout becomes a signal almost approximate to the image signal D_En1. Namely, in the texture portion, the image signal obtained by performing a process (general enhancement process) of the enhancement processing unit 431 is output as the image signal Dout. In the texture portion of the image formed according to the image signal Dout, a feeling of detail is appropriately retained.

(2) In the case other than the case (1), since α is "1", the image signal Dout becomes the image signal D_En2. Namely, in the edge portion, the image signal obtained by performing a process (direction enhancement process) of the direction enhancement processing unit 432 is output as the image signal Dout. In the portion (for example, the edge portion) other than the texture portion of the image formed according to the image signal Dout, jaggies, mosquito noise, or the like are appropriately reduced.

As described above, the image processing device 4000 can acquire the output image signal Dout (output image Dout) (1) by performing a process (general enhancement process) of the enhancement processing unit 431 on the texture portion of the image and (2) by performing a process (direction enhancement process) of the direction enhancement processing unit 432 on the other portion.

Therefore, in the image processing device 4000, even in a case where contrast of the luminance value or the like of the input image signal (video signal) is greatly changed, the edge portion and the texture portion are appropriately separated, so that the image process (enhancement process) can be appropriately performed. Namely, in the image processing device 4000, the direction enhancement process taking into consideration the direction dependency is performed on the portion other than the texture portion, and a general enhancement process (high frequency emphasis process) not taking into consideration the direction dependency is performed on the texture portion, so that the enhancement process can be appropriately performed on the portion (for example, the edge portion) other than the texture portion and the texture portion.

In addition, in the image processing device 4000, since the portion where the edge detection signal Det_edge is to be detected, the luminance variation level determination unit 435, and the selector 436 are removed from the image processing device 3000 according to the third embodiment, the cost for implementation can be reduced in comparison with the image processing device 3000 according to the third embodiment.

Fifth Embodiment

Next, a fifth embodiment will be described.

In addition, hereinafter, characteristic aspects of the embodiment are described; and the same components as those of the above-described embodiment are denoted by the same reference numerals, and the detailed description thereof is omitted.

Figure 16:
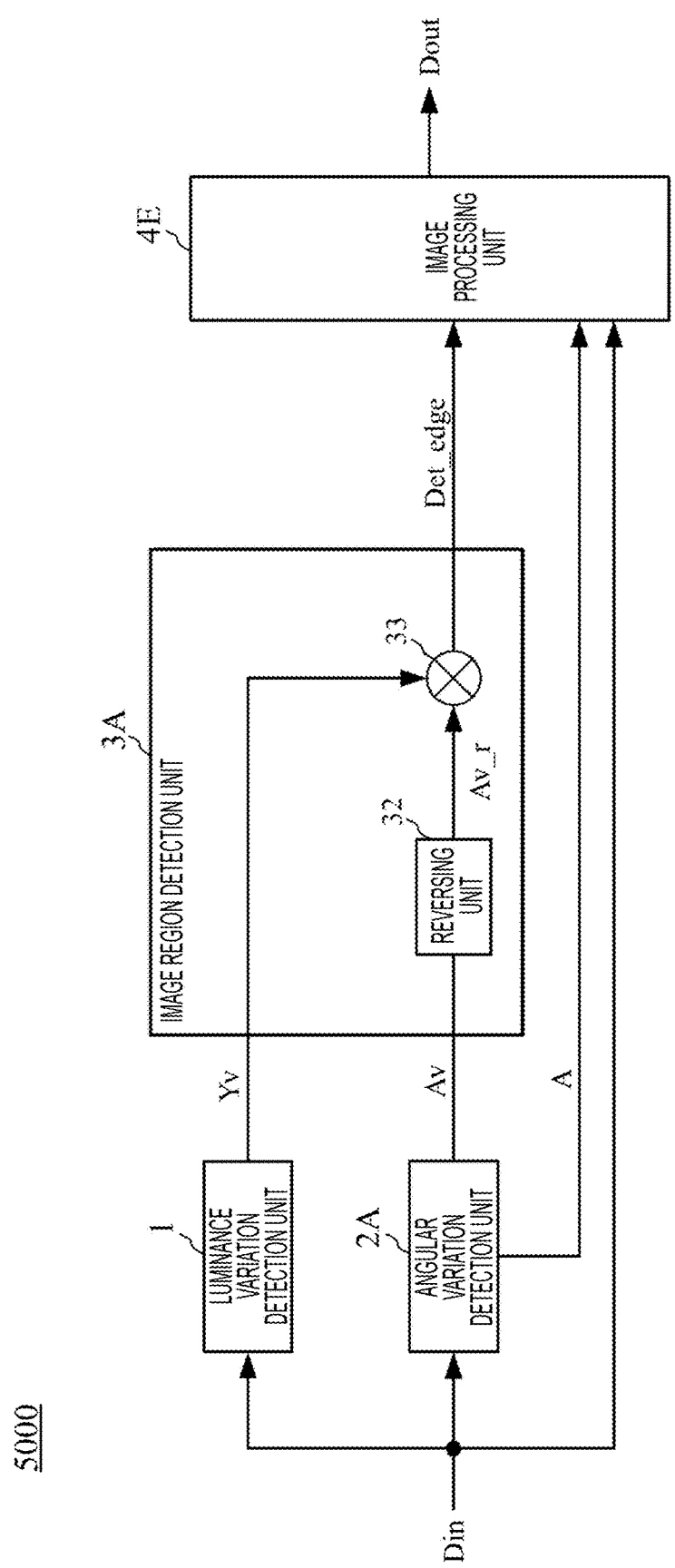
FIG. 16 is a schematic configuration diagram of an image processing device 5000 according to a fifth embodiment.

FIG. 16 illustrates a schematic configuration diagram of an image processing device 5000 according to a fifth embodiment.

Figure 17:
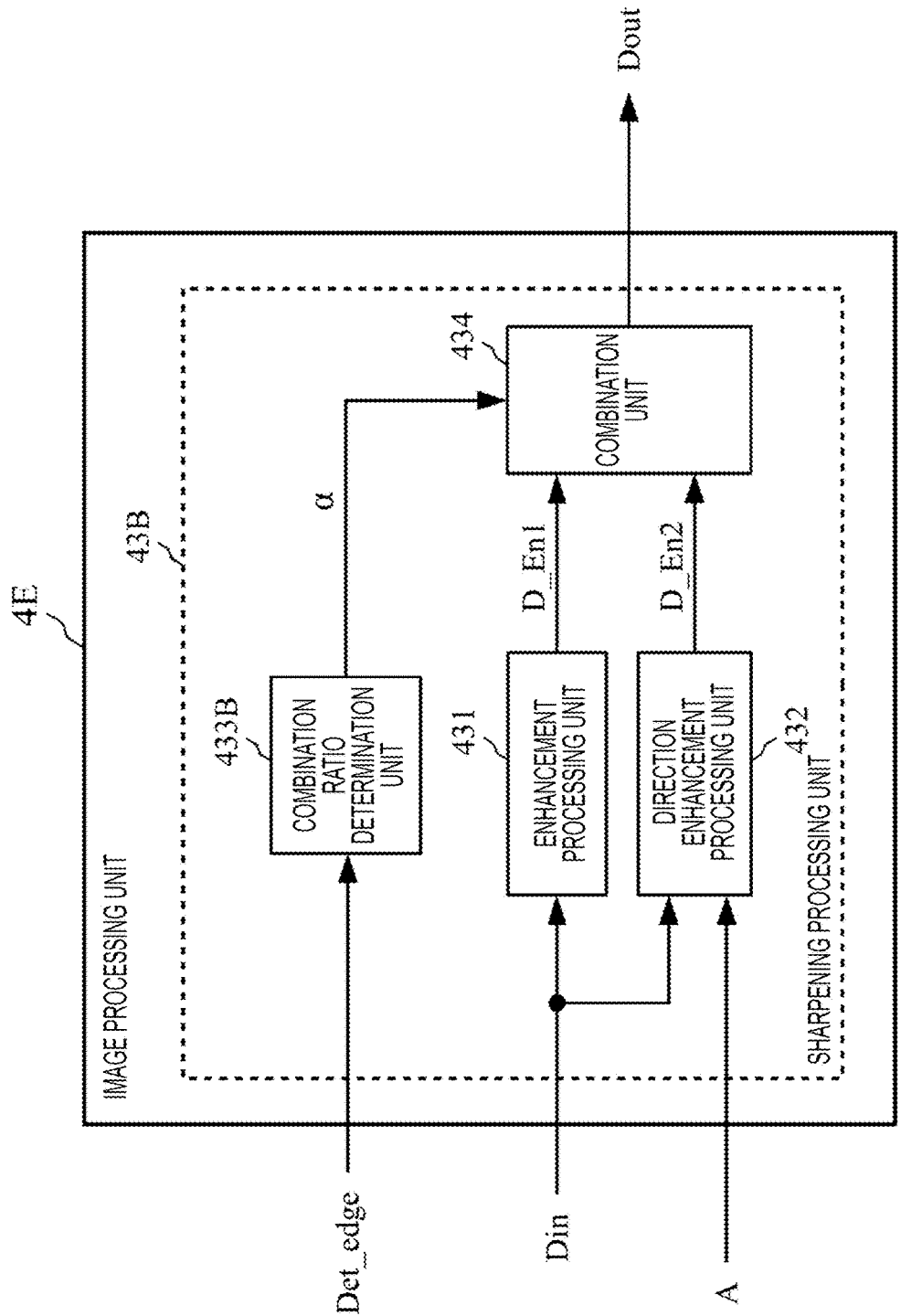
FIG. 17 is a schematic configuration diagram of an image processing unit 4E according to the fifth embodiment.

FIG. 17 illustrates a schematic configuration diagram of an image processing unit 4E according to the fifth embodiment.

The image processing device 5000 according to the embodiment has a configuration where, in the image processing device 3000 according to the third embodiment, the image region detection unit 3 is replaced with an image region detection unit 3A, and the image processing unit 4C is replaced with an image processing unit 4E. With respect to the other configurations, the image processing device 5000 according to the embodiment is the same as the image processing device 3000 according to the third embodiment.

As illustrated in FIG. 16, the image region detection unit 3A has a configuration where the first multiplier 31 is removed from the image region detection unit 3 according to the third embodiment. Namely, although the image region detection unit 3 acquires the texture detection signal Det_txt and the edge detection signal Det_edge, the image region detection unit 3A acquires only the edge detection signal Det_edge.

The image region detection unit 3A outputs the acquired edge detection signal Det_edge to the image processing unit 4E.

As illustrated in FIG. 17, the image processing unit 4E has a configuration where, in the image processing unit 4C according to the third embodiment, the combination ratio determination unit 433 is replaced with a combination ratio determination unit 433B. With respect to the other configurations, the image processing unit 4E is the same as the image processing unit 4C.

The combination ratio determination unit 433B is input with the edge detection signal Det_edge output from the image region detection unit 3A and determines combination ratio α based on the input edge detection signal Det_edge.

More specifically, the combination ratio determination unit 433B determines the combination ratio α as follows. In addition, it is assumed that 0≤α≤1.

(1) In a case where the value of the edge detection signal Det_edge is larger than a predetermined threshold value (when the edge detection signal is a binary signal, in a case where the edge detection signal Det_edge is "1"), α is set to a value αe approximate to "1" (may be set to αe=1).

(2) In the case other than the case (1), α is set to "0".

The combination ratio α determined in the above method is output to the combination unit 434.

Then, the combination unit 434 acquires the image signal Dout by combining the image signal D_En1 output from the enhancement processing unit 431 and the image signal D_En2 output from the direction enhancement processing unit 432 by a process (internal division process) corresponding to, for example, the following equation according to the combination ratio α.

$$Dout=(1-\alpha) \times D\_En1 + \alpha \times D\_En2$$

$$0 \leq \alpha \leq 1$$

(1) In the case of α=αe (in a case where it is determined as the edge portion) since αe is a value approximate to "1", the image signal Dout becomes a signal almost approximate to the image signal D_En2. Namely, in the edge portion, the image signal obtained by performing a process (direction enhancement process) of the direction enhancement processing unit 432 is output as the image signal Dout. In the edge portion of the image formed according to the image signal Dout, jaggies, mosquito noise, or the like are appropriately reduced.

(2) In the case other than the case (1), since α is "0", the image signal Dout becomes the image signal D_En1. Namely, in the portion other than the edge portion, the image signal obtained by performing a process (general enhancement process) of the enhancement processing unit 431 is output as the image signal Dout. In the portion (for example, the texture portion) other than the edge portion of the image formed according to the image signal Dout, a feeling of detail is appropriately retained.

As described above, the image processing device 5000 can acquire the output image signal Dout (output image Dout) (1) by performing a process (general enhancement process) of the enhancement processing unit 431 on the portion (for example, the texture portion) other than the edge portion of the image and (2) by performing a process (direction enhancement process) of the direction enhancement processing unit 432 on the edge portion of the image.

Therefore, in the image processing device 5000, even in a case where contrast of the luminance value or the like of the input image signal (video signal) is greatly changed, the edge portion and the texture portion are appropriately separated, so that the image process (enhancement process) can be appropriately performed. Namely, in the image processing device 5000, the direction enhancement process taking into consideration the direction dependency is performed on the edge portion, and a general enhancement process (high frequency emphasis process) not taking into consideration the direction dependency is performed on the portion (for example, the texture portion) other than the edge portion, so that the enhancement process can be appropriately performed on the portion (for example, the texture portion) other than the edge portion and the edge portion.

In addition, in the image processing device 5000, since the portion where the texture detection signal Det_txt is to be detected, the luminance variation level determination unit 435, and the selector 436 are removed from the image processing device 3000 according to the third embodiment, the cost for implementation can be reduced in comparison with the image processing device 3000 according to the third embodiment.

Other Embodiments

In the above-described embodiments (including the modified examples), the case of adjusting a process strength by combining an image signal where a process is performed and an image signal where the process is not performed by using a combination ratio α or β in the noise processing units 41 and 41B and the enhancement unit 42 is described. However, the present invention is not limited thereto, but for example, by changing a filter coefficient based on the texture detection signal Det_txt and/or the edge detection signal Det_edge, the process strength (for example, the process strength of the noise reduction process or the process strength of the enhancement process) may be adjusted. In addition, a plurality of filters having different characteristics are installed, and outputs thereof can be selected by a selector, and by changing a filter selected based on the texture detection signal Det_txt and/or the edge detection signal Det_edge, the process strength (for example, the process strength of the noise reduction process or the process strength of the enhancement process) may be adjusted.

In addition, in the above-described embodiments (including the modified examples), a case where the luminance variation detection unit 1 acquires the signal Yv for detecting the region (image region where a change in luminance value is large) of the edge portion and the texture portion by calculating the variation value of the luminance value of the image signal is described. However, the present invention is not limited thereto, but the luminance variation detection unit 1 may be configured to extract the image region including many high frequency components by using, for example, an HPF (for example, a Sobel filter) or the like and to output a signal representing a result of the extraction instead of the luminance variation value Yv. Since the signal extracted by using the above method also has the same tendency as that of the luminance variation value Yv, the processes after the image region detection unit 3, 3A can be performed according to the extracted signal in the same manner as the above-described embodiments.

In addition, in the above-described embodiments, a case where the enhancement processing unit 431 performing a general enhancement process is implemented by the configuration illustrated in FIG. 12 is described. However, the enhancement processing unit 431 is not limited to the above configuration. For example, the enhancement processing unit 431 may be configured to extract a high frequency component of the input image signal and to combine (for example, to add) the signal where the extracted high frequency component is emphasized and the signal where a lower frequency component of the input image signal is extracted.

In addition, the image processing device may be implemented by combining all or a portion of the above-described embodiments (including the modified examples).

In addition, a portion or all of the image processing device according to the above-described embodiments may be implemented as an integrated circuit (for example, an LSI, a system LSI, or the like).

All or a portion of the processes of each functional block of the above-described embodiments may be implemented by a program. In addition, a portion or all of the processes of each functional block of the above-described may be executed by a central processing unit (CPU) in a computer. In addition, the program for executing each process may be stored in a storage device such as a hard disk drive or a ROM, and the central processing unit (CPU) may read out the program from the ROM or RAM and execute the program.

In addition, each process of the above-described embodiments may be implemented by hardware, or each process may be implemented by software (including a case where the process is implemented together with OS (operating system), middleware, or a predetermined library). In addition, each process may be implemented by a combination of software and hardware.

In addition, in a case where the image processing device according to the above-described embodiments is implemented by hardware, timing adjustment for performing processes needs to be performed. In the above-described embodiments, for the convenience of description, details of the timing adjustment of various signals generated according to actual hardware design are omitted. In addition, a delay device or the like for performing the timing adjustment is omitted in illustration.

In addition, execution sequence in the processing method of the above-described embodiments is not necessarily limited to the disclosure of the above-described embodiments, but the execution sequence may be changed within the scope without departing from the spirit of the invention.

A computer-readable recording medium where a computer program allowing a computer to execute the above-described method and a program for the method are recorded is included in the scope of the invention. Herein, as the computer-readable recording medium, for example, a flexible disk, a hard disk drive, a CD-ROM, an MO, a DVD, a large-capacity DVD, a next-generation DVD, a semiconductor memory, or the like may be used.

The computer program is not limited to a computer program recorded on the recording medium, but a computer program transmitted via a telecommunication line, wireless or wired communication line, a network typified by the Internet may be used.

In addition, specific configurations of the invention are not limited to the above-described embodiments, but various changes and modifications are available within the scope without departing from the spirit of the invention.

[Appendix]

In addition, the present invention may also be represented as follows.

A first configuration is an image processing device including a luminance variation detection unit, an angular variation detection unit, an image region detection unit, and an image processing unit.

The luminance variation detection unit detects a degree of variation of a pixel value in a pixel reference region including a pixel of interest and pixels around the pixel of interest.

The angular variation detection unit acquires a contour direction where the pixel value is constant in the pixel reference region for each pixel and detects a degree of variation of the contour direction acquired for each pixel.

The image region detection unit acquires an image region detection signal representing characteristics of an image region including the pixel of interest based on the degree of variation of the pixel value and the degree of variation of the contour direction.

The image processing unit performs a predetermined image process on the pixel of interest based on the image region detection signal.

In the image processing device, by taking into consideration both of the degree of variation of the pixel value and the degree of variation of the contour direction, the image region detection signal representing the characteristics of the image region including the pixel of interest is acquired. Therefore, it can be determined according to the image region detection signal whether or not the pixel of interest is included in a region having a predetermined image characteristic amount. For example, it can be determined according to the image region detection signal whether or not the pixel of interest is included in the edge image region or the texture image region. Therefore, in the image processing device, since the image processing unit performs a predetermined image process on the pixel of interest based on the image region detection signal, an appropriate image process according to the characteristic of the image region including the pixel of interest can be performed.

Namely, in the image processing device, by taking into consideration both of the degree of variation of the pixel value and the degree of variation of the contour direction, for example, even in a case where contrast of the pixel value (the luminance value or the like) of the input image signal (video signal) is greatly changed, the image region (for example, the edge portion and the texture portion) having a predetermined image characteristic amount can be appropriately separated. In a case where contrast of the pixel value (the luminance value or the like) of the input image signal (video signal) is greatly changed, when the image region (for example, the edge portion and the texture portion) having predetermined image characteristic amount is to be separated by using only the degree of variation of the pixel value (luminance or the like), in some cases, erroneous determination may be made. In the image processing device, by taking into consideration the degree of variation of the contour direction as well as the degree of variation of the pixel value, the property of the image region is determined, namely, it is determined which image region the pixel of interest is included. Since the degree of variation of the contour direction is not easily influenced by a change in contrast value of the image signal, in the image processing device, a predetermined image region (for example, an edge portion and a texture portion) can be separated by taking into consideration both of the degree of variation of the pixel value and the degree of variation of the contour direction, so that appropriate respective image processes can be performed on the separated image regions.

In addition, the "degree of variation" is a concept including, for example, a variation value, a standard deviation value, a summation value of differential absolute values, an average value of differential absolute values, and the like.

In addition, the "predetermined image processing" is a concept including, for example, a noise reduction process, a high frequency component suppression process, a lower frequency component emphasis process, a smoothening process, an LPF process, a BPF process, an enhancement process, and the like.

A second configuration is that, in the first configuration, the image processing unit performs a predetermined image process on the pixel of interest according to a process strength determined based on the image region detection signal.

Therefore, in the image processing device, since the image processing unit performs a predetermined image process on the pixel of interest according to the process strength determined based on the image region detection signal, an appropriate image process according to the characteristics of the image region including the pixel of interest can be performed.

A third configuration is that, in the second configuration, the image region detection unit acquires an edge detection signal representing that the pixel of interest is included in an edge region as the image region detection signal based on the degree of variation of the pixel value and the degree of variation of the contour direction.

The image processing unit performs a predetermined image process on the pixel of interest according to a process strength determined based on the edge detection signal.

Therefore, in the image processing device, it can be determined according to the edge detection signal acquired taking into consideration both of the degree of variation of the pixel value and the degree of variation of the contour direction whether or not the pixel of interest is included in the edge image region. In addition, in the image processing device, since a predetermined image process is performed on the pixel of interest according to the process strength determined based on the edge detection signal, for example, an appropriate image process (for example, a noise reduction process) is performed on the edge image region.

In addition, the "edge region" denotes an image region on an image which includes an edge (for example, a boundary, a contour, and the like).

A fourth configuration is that, in the second or third configuration, the image region detection unit acquires a texture detection signal representing that the pixel of interest is included in a texture region as the image region detection signal based on the degree of variation of the pixel value and the degree of variation of the contour direction.

The image processing unit performs a predetermined image process on the pixel of interest according to a process strength determined based on the texture detection signal.

Therefore, in the image processing device, it can be determined according to the texture detection signal acquired by taking into consideration both of the degree of variation of the pixel value and the degree of variation of the contour direction whether or not the pixel of interest is included in the texture image region. In addition, in the image processing device, since a predetermined image process is performed on the pixel of interest according to the process strength determined based on the texture detection signal, for example, an appropriate image process (for example, an enhancement process) is performed on the texture image region.

In addition, the "texture region" denotes an image region on an image which includes a texture (for example, a detail portion including many high frequency components, and the like).

A fifth configuration is that, in the second configuration, the image region detection unit acquires two detection signals of an edge detection signal representing that the pixel of interest is included in an edge region and a texture detection signal representing that the pixel of interest is included in a texture region as the image region detection signal based on the degree of variation of the pixel value and the degree of variation of the contour direction.

The image processing unit performs a predetermined image process on the pixel of interest according to a process strength determined based on at least one of the edge detection signal and the texture detection signal.

Therefore, in the image processing device, it can be determined according to the two detection signals of the edge detection signal and the texture detection signal acquired by taking into consideration both of the degree of variation of the pixel value and the degree of variation of the contour direction whether or not the pixel of interest is included in the edge image region or the texture image region. In addition, in the image processing device, since a predetermined image process is performed on the pixel of interest according to the process strength determined based on the edge detection signal and the texture detection signal, for example, an appropriate image process (for example, an enhancement process) can be performed on the texture image region, and an appropriate image process (for example, a noise reduction process) can also be performed on the edge image region.

A sixth configuration is that, in the first configuration, the image processing unit performs an image process according to the characteristics of the image region represented by the image region detection signal on the pixel of interest.

Therefore, in the image processing device, an image process according to the characteristics of the image region represented by the image region detection signal can be performed on the pixel of interest.

In addition, the "image process according to the characteristics of the image region" is a concept including an image process of determining characteristics of an image region and improving an image quality of the image region based on a result of the determination. For example, as a result of the determination about the characteristics of the image region, in a case where the image region is a texture portion, an image process (for example, a general enhancement process) of naturally emphasizing the texture portion is an example of the "image process according to the characteristics of the image region". In addition, for example, as a result of the determination about the characteristics of the image region, in a case where the image region is an edge portion, an image process (for example, a direction enhancement process taking into consideration a direction dependency on an image) of naturally emphasizing the edge portion is an example of the "image process according to the characteristics of the image region".

A seventh configuration is that, in the sixth configuration, the image region detection unit acquires an edge detection signal representing that the pixel of interest is included in an edge region as the image region detection signal based on the degree of variation of the pixel value and the degree of variation of the contour direction.

(1) In a case where it is determined according to the edge detection signal that the pixel of interest is not included in the edge region, the image processing unit performs a general enhancement process of emphasizing a high frequency component on the pixel of interest, and (2) in a case where it is determined according to the edge detection signal that the pixel of interest is included in the edge region, the image processing unit acquires a low pass filtering process signal by performing a smoothening process on the pixel of interest by using a pixel value of a reference pixel where the contour direction acquired by the angular variation detection unit is the same as or approximate to that of the pixel of interest and acquires a high frequency extension signal obtained by emphasizing the high frequency component of the acquired low pass filtering process signal, so that a direction enhancement process taking into consideration a direction dependency on an image is performed on the pixel of interest.

In the image processing device, the direction enhancement process taking into consideration the direction dependency is performed on the edge portion, and the general enhancement process (high frequency emphasis process) not taking into consideration the direction dependency is performed on the portion (for example, the texture portion) other than the edge portion, so that an appropriate enhancement process can be performed on the portion (example, the texture portion) other than the edge portion and the edge portion.

An eighth configuration is that, in the sixth configuration, the image region detection unit acquires a texture detection signal representing that the pixel of interest is included in a texture region as the image region detection signal based on the degree of variation of the pixel value and the degree of variation of the contour direction, (1) In a case where it is determined according to the texture detection signal that the pixel of interest is included in the texture region, the image processing unit performs a general enhancement process of emphasizing a high frequency component on the pixel of interest, and (2) in a case where it is determined according to the texture detection signal that the pixel of interest is not included in the texture region, the image processing unit acquires a low pass filtering process signal by performing a smoothening process on the pixel of interest by using a pixel value of a reference pixel where the contour direction acquired by the angular variation detection unit is the same as or approximate to that of the pixel of interest and acquires a high frequency extension signal obtained by emphasizing the high frequency component of the acquired low pass filtering process signal, so that a direction enhancement process taking into consideration a direction dependency on an image is performed on the pixel of interest.

In the image processing device, the direction enhancement process taking into consideration the direction dependency is performed on the portion other than the texture portion of the image, and the general enhancement process (high frequency emphasis process) direction enhancement process not taking into consideration the direction dependency is performed on the texture portion, so that an appropriate enhancement process can be performed on the portion (for example, the edge portion) other than the texture portion and the texture portion.

A ninth configuration is that, in the sixth configuration, the image region detection unit acquires two detection signals of an edge detection signal representing that the pixel of interest is included in an edge region and a texture detection signal representing that the pixel of interest is included in a texture region as the image region detection signal based on the degree of variation of the pixel value and the degree of variation of the contour direction.

(1) In a case where it is determined according to at least one of the edge detection signal and the texture detection signal that the pixel of interest is included in the texture region, the image processing unit performs a general enhancement process of emphasizing a high frequency component on the pixel of interest, and (2) in a case where it is determined according to at least one of the edge detection signal and the texture detection signal that the pixel of interest is included in the edge region, the image processing unit acquires a low pass filtering process signal by performing a smoothening process on the pixel of interest by using a pixel value of a reference pixel where the contour direction acquired by the angular variation detection unit is the same as or approximate to that of the pixel of interest and acquires a high frequency extension signal obtained by emphasizing the high frequency component of the acquired low pass filtering process signal, so that a direction enhancement process taking into consideration a direction dependency on an image is performed on the pixel of interest.

In the image processing device, the direction enhancement process taking into consideration the direction dependency is performed on the edge portion, and the general enhancement process (high frequency emphasis process) not taking into consideration the direction dependency is performed on the texture portion, so that an appropriate enhancement process can be performed on the texture portion and the edge portion.

A tenth configuration is that, in any one of the first to ninth configurations, when the coordinate of the pixel of interest on the image is denoted by (x, y); the pixel value of the pixel of interest is denoted by P(x, y); variables i, j, and n are set as integers, when the filter coefficient Wx(x+i, y+j) are set as follow:
(1) when $-n \le i < 0$, Wx(x+i, y+j)=$-1$;
(2) when i=0, Wx(x+i, y+j)=0; and
(3) when $0 < i \le n$, Wx(x+i, y+j)=1, and when the filter coefficient Wy(x+i, y+j) is set as follows:
(1) when $-n \le j < 0$, Wy(x+i, y+j)=$-1$;
(2) when j=0, Wy(x+i, y+j)=0; and
(3) when $0 < j \le n$, Wy(x+i, y+j)=1, the angular variation detection unit calculates an x-directional partial derivative value Gx(x, y) of the pixel of interest (x, y) and a y-directional partial derivative value Gy(x, y) of the pixel of interest by the following equations.

[Mathematical Formula 9]

$$Gx(x, y) = \sum_{j=-n}^{n} \sum_{i=-n}^{n} P(x+i, y+j) \cdot Wx(x+i, y+j) \quad (9)$$

[Mathematical Formula 10]

$$Gy(x, y) = \sum_{j=-n}^{n} \sum_{i=-n}^{n} P(x+i, y+j) \cdot Wy(x+i, y+j) \quad (10)$$

The angular variation detection unit calculates a value representing the contour direction based on an angle θ(x, y) calculated by the following equation.

$\theta(x,y) = \tan^{-1}(Gy(x,y)/Gx(x,y))$

Therefore, in the image processing device, a degree of variation of the angle θ(x, y) is calculated, so that a degree of variation of the contour direction can be calculated.

INDUSTRIAL APPLICABILITY

According to the present invention, even in a case where contrast of a luminance value or the like of an input image signal (video signal) is greatly changed, an edge portion and a texture portion are appropriately separated, so that an image process (for example, a noise reduction process or an enhancement process) can be appropriately performed. Therefore, the present invention is useful for video-related industries and can be embodied in the field.

REFERENCE SIGNS LIST

1000, 2000, 3000, 4000, 5000: image processing device
1: luminance variation detection unit 2: angular variation detection unit
3, 3A, 3B: image region detection unit
4, 4A, 4B, 4C, 4D, 4D: image processing unit
41: noise processing unit
42: enhancement unit
43, 43A, 43B: sharpening processing unit
431: enhancement processing unit
432: direction enhancement processing unit
434: combination unit

The invention claimed is:

1. An image processing device comprising:
circuitry; and
a memory associated with the circuitry; wherein
the circuitry detects a degree of variation of a pixel value in a pixel reference region including a pixel of interest and pixels around the pixel of interest;
the circuitry acquires a contour direction where the pixel value is constant in the pixel reference region for each pixel and detects a degree of variation of the contour direction acquired for each pixel;
the circuitry acquires an image region detection signal representing characteristics of an image region including the pixel of interest based on the degree of variation of the pixel value and the degree of variation of the contour direction; and
the circuitry performs a predetermined image process on the pixel of interest based on the image region detection signal.

2. The image processing device according to claim 1, wherein the circuitry performs a predetermined image process on the pixel of interest based on a process strength determined based on the image region detection signal.

3. The image processing device according to claim 2, wherein
the circuitry acquires an edge detection signal representing that the pixel of interest is included in an edge region as the image region detection signal based on the degree of variation of the pixel value and the degree of variation of the contour direction, and
the circuitry performs the predetermined image process on the pixel of interest according to a process strength determined based on the edge detection signal.

4. The image processing device according to claim 2, wherein
the circuitry acquires a texture detection signal representing that the pixel of interest is included in a texture region as the image region detection signal based on the degree of variation of the pixel value and the degree of variation of the contour direction, and
the circuitry performs the predetermined image process on the pixel of interest according to a process strength determined based on the texture detection signal.

5. The image processing device according to claim 2, wherein
the circuitry acquires two detection signals of an edge detection signal representing that the pixel of interest is included in an edge region and a texture detection signal representing that the pixel of interest is included in a texture region as the image region detection signal based on the degree of variation of the pixel value and the degree of variation of the contour direction, and
the circuitry performs the predetermined image process on the pixel of interest according to a process strength determined based on at least one of the edge detection signal and the texture detection signal.

6. The image processing device according to claim 1, wherein the circuitry performs an image process according to the characteristics of the image region represented by the image region detection signal on the pixel of interest.

7. The image processing device according to claim 6, wherein
the circuitry acquires an edge detection signal representing that the pixel of interest is included in an edge region as the image region detection signal based on the degree of variation of the pixel value and the degree of variation of the contour direction,
(1) in a case where it is determined according to the edge detection signal that the pixel of interest is not included in the edge region, the circuitry performs a general enhancement process of emphasizing a high frequency component on the pixel of interest, and
(2) in a case where it is determined according to the edge detection signal that the pixel of interest is included in the edge region, the circuitry acquires a low pass filtering process signal by performing a smoothening process on the pixel of interest by using a pixel value of a reference pixel where the contour direction acquired by the circuitry is the same as or approximate to that of the pixel of interest and acquires a high frequency extension signal obtained by emphasizing the high frequency component of the acquired low pass filtering process signal, so that a direction enhancement process taking into consideration a direction dependency on an image is performed on the pixel of interest.

8. The image processing device according to claim 6, wherein
the circuitry acquires a texture detection signal representing that the pixel of interest is included in a texture region as the image region detection signal based on the degree of variation of the pixel value and the degree of variation of the contour direction,
(1) in a case where it is determined according to the texture detection signal that the pixel of interest is included in the texture region, the circuitry performs a general enhancement process of emphasizing a high frequency component on the pixel of interest, and
(2) in a case where it is determined according to the texture detection signal that the pixel of interest is not included in the texture region, the circuitry acquires a low pass filtering process signal by performing a smoothening process on the pixel of interest by using a pixel value of a reference pixel where the contour direction acquired by the circuitry is the same as or approximate to that of the pixel of interest and acquires a high frequency extension signal obtained by emphasizing the high frequency component of the acquired low pass filtering process signal, so that a direction enhancement process taking into consideration a direction dependency on an image is performed on the pixel of interest.

9. The image processing device according to claim 6, wherein
the circuitry acquires two detection signals of an edge detection signal representing that the pixel of interest is included in an edge region and a texture detection signal representing that the pixel of interest is included in a texture region as the image region detection signal based on the degree of variation of the pixel value and the degree of variation of the contour direction,
(1) in a case where it is determined according to at least one of the edge detection signal and the texture detection signal that the pixel of interest is included in the texture region, the circuitry performs a general enhancement process of emphasizing a high frequency component on the pixel of interest, and (2) in a case where it is determined according to at least one of the edge detection signal and the texture detection signal that the pixel of interest is included in the edge region, the circuitry acquires a low pass filtering process signal by performing a smoothening process on the pixel of interest by using a pixel value of a reference pixel where the contour direction acquired by the circuitry is the same as or approximate to that of the pixel of interest and acquires a high frequency extension signal obtained by emphasizing the high frequency component of the acquired low pass filtering process signal, so that a direction enhancement process taking into consideration a direction dependency on an image is performed on the pixel of interest.

10. The image processing device according to claim 1, wherein
when the coordinate of the pixel of interest on the image is denoted by (x, y); the pixel value of the pixel of interest is denoted by P(x, y); and variables i, j, and n are set as integers,
when the filter coefficient Wx(x+i, y+j) is set as follows:
(1) when −n≤i<0; Wx(x+i, y+j)=−1;
(2) when i=0; Wx(x+i, y+j)=0; and
(3) when 0<i≤n, Wx(x+i, y+j)=1;
when the filter coefficient Wy(x+i, y+j) are as follows:
(1) when −n≤j<0, Wy(x+i, y+j)=−1;
(2) when j=0, Wy(x+i, y+j)=0; and
(3) when 0<j≤n, Wy(x+i, y+j)=1,
the circuitry calculates an x-directional partial derivative value Gx(x, y) of the pixel of interest (x, y) and a y-directional partial derivative value Gy(x, y) of the pixel of interest by the following equations, and $$Gx(x, y) = \sum_{j=-n}^{n} \sum_{i=-n}^{n} P(x + i, y + j) \cdot Wx(x + i, y + j) \quad \text{(cl 10-1)}$$

$$Gy(x, y) = \sum_{j=-n}^{n} \sum_{i=-n}^{n} P(x + i, y + j) \cdot Wy(x + i, y + j) \quad \text{(cl 10-2)}$$

the circuitry calculates a value representing the contour direction based on an angle θ(x, y) calculated by the following equation:

θ(x,y)=tan$^{-1}$(Gy(x,y)/Gx(x,y)).

* * * * *